United States Patent
Jeong et al.

(10) Patent No.: US 11,941,315 B2
(45) Date of Patent: Mar. 26, 2024

(54) WEARABLE ELECTRONIC DEVICE FOR DISPLAYING AUGMENTED REALITY OBJECT AND METHOD FOR OPERATING THE SAME

(71) Applicant: Samsung Electronics Co., Ltd., Suwon-si (KR)

(72) Inventors: Jinhong Jeong, Suwon-si (KR); Eunsu Jeong, Suwon-si (KR); Minji Cho, Suwon-si (KR); Seokhyun Kim, Suwon-si (KR); Gajin Song, Suwon-si (KR); Sunkey Lee, Suwon-si (KR); Chaigil Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/893,605

(22) Filed: Aug. 23, 2022

(65) Prior Publication Data
US 2023/0058340 A1 Feb. 23, 2023

Related U.S. Application Data
(63) Continuation of application No. PCT/KR2022/012532, filed on Aug. 22, 2022.

(30) Foreign Application Priority Data

| Aug. 23, 2021 | (KR) | .................. 10-2021-0111154 |
| Nov. 16, 2021 | (KR) | .................. 10-2021-0157721 |

(51) Int. Cl.
- *G06F 3/14* (2006.01)
- *G02B 27/01* (2006.01)
- *G06F 3/01* (2006.01)

(52) U.S. Cl.
CPC .......... *G06F 3/14* (2013.01); *G02B 27/0172* (2013.01); *G02B 27/0179* (2013.01);
(Continued)

(58) Field of Classification Search
CPC . G06F 3/013; G06F 3/016; G06F 3/14; G06F 3/017; G06F 3/011; G02B 27/0172;
(Continued)

(56) References Cited

U.S. PATENT DOCUMENTS

| 2014/0168056 A1 | 6/2014 | Swaminathan et al. |
| 2014/0168261 A1 | 6/2014 | Margolis et al. |

(Continued)

FOREIGN PATENT DOCUMENTS

| JP | 2015-084150 A | 4/2015 |
| KR | 10-2015-0033203 A | 4/2015 |

(Continued)

OTHER PUBLICATIONS

International Search Report and Written Opinion dated Nov. 21, 2022, issued in International Patent Application No. PCT/KR2022/012532.

*Primary Examiner* — Md Saiful A Siddiqui
(74) *Attorney, Agent, or Firm* — Jefferson IP Law, LLP

(57) ABSTRACT

A wearable electronic device is provided. The electronic device includes a camera, a communication circuit, a display including a transparent lens and displaying content through the lens, and a processor, wherein the processor may be configured to obtain first information about a first device indicated by a first object through the communication circuit when the first object is selected from among a plurality of objects for controlling devices displayed on an external electronic device, identify a first position for displaying the first information corresponding to the first object as an augmented reality image, based on a gaze direction of a user
(Continued)

identified through the camera, determine a property of the augmented reality image, based on a user input, and control the display to display the augmented reality image having the property at the first position.

24 Claims, 18 Drawing Sheets

(52) U.S. Cl.
CPC .............. *G06F 3/013* (2013.01); *G06F 3/017* (2013.01); *G02B 2027/0138* (2013.01); *G02B 2027/014* (2013.01); *G02B 2027/0187* (2013.01)

(58) Field of Classification Search
CPC ........ G02B 27/0179; G02B 2027/0138; G02B 2027/014; G02B 2027/0187; G02B 27/0093; G09G 2340/0464; G09G 5/373; G09G 5/38
See application file for complete search history.

(56) References Cited

U.S. PATENT DOCUMENTS

| | | | |
|---|---|---|---|
| 2014/0237366 A1* | 8/2014 | Poulos | G06F 3/013 715/728 |
| 2015/0087357 A1 | 3/2015 | Jung et al. | |
| 2015/0324645 A1 | 11/2015 | Jang et al. | |
| 2015/0326707 A1 | 11/2015 | Lee et al. | |
| 2016/0048964 A1* | 2/2016 | Kruglick | G06V 10/50 382/103 |
| 2017/0185276 A1* | 6/2017 | Lee | G06F 3/04847 |
| 2017/0337897 A1* | 11/2017 | Jung | G02B 27/017 |
| 2018/0045963 A1 | 2/2018 | Hoover et al. | |
| 2019/0075610 A1* | 3/2019 | Ko | H04W 12/50 |
| 2019/0129607 A1* | 5/2019 | Saurabh | G06F 3/011 |
| 2019/0324279 A1 | 10/2019 | Hwang et al. | |
| 2019/0354259 A1 | 11/2019 | Park | |
| 2020/0326775 A1* | 10/2020 | Koo | G06T 7/521 |
| 2021/0097729 A1 | 4/2021 | Palangie et al. | |
| 2021/0097766 A1 | 4/2021 | Palangie et al. | |
| 2021/0134067 A1 | 5/2021 | Uibricht et al. | |
| 2021/0158624 A1 | 5/2021 | Moon et al. | |

FOREIGN PATENT DOCUMENTS

| | | |
|---|---|---|
| KR | 10-2015-0127479 A | 11/2015 |
| KR | 10-1730881 B | 4/2017 |
| KR | 10-2017-0089662 A | 8/2017 |
| KR | 10-2018-0071092 A | 6/2018 |
| KR | 10-2019-0119206 A | 10/2019 |
| KR | 10-2019-0130770 A | 11/2019 |
| KR | 10-2021-0063928 A | 6/2021 |

\* cited by examiner

WEARABLE ELECTRONIC DEVICE FOR DISPLAYING AUGMENTED REALITY OBJECT AND METHOD FOR OPERATING THE SAME

CROSS-REFERENCE TO RELATED APPLICATION(S)

This application is a continuation application, claiming priority under § 365(c), of an International application No. PCT/KR2022/012532, filed on Aug. 22, 2022, which is based on and claims the benefit of a Korean patent application number 10-2021-0111154, filed on Aug. 23, 2021, in the Korean Intellectual Property Office, and of a Korean patent application number 10-2021-0157721, filed on Nov. 16, 2021, in the Korean Intellectual Property Office, the disclosure of which is incorporated by reference herein in its entirety.

TECHNICAL FIELD

The disclosure relates to a wearable electronic device for displaying an augmented reality object and a method for operating the same.

BACKGROUND ART

With an increase in the degree of integration of electronic devices and development of ultrahigh-speed and high-capacity wireless communication, various functions are mounted in a single electronic device. For example, not only a communication function but also an entertainment function, such as game, a multimedia function, such as music/video playback, communication and security functions for mobile banking or the like, and schedule management and electronic wallet functions are integrated in a single electronic device.

As the performances of a display device and a battery are improved, compact and portable electronic devices are actively being developed. For example, an electronic device or wearable electronic device that may be worn on a body part, such as a head, has been introduced.

Recently, various services and functions provided by portable devices have been gradually expanding. In addition, various applications executable in portable devices are being developed. To increase the utility value of portable devices and satisfy a variety of needs of users, various wearable portable devices, such as smart glasses or a head-mounted display device, are being developed.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Augmented reality (AR) technology may refer to a technology that superimposes a virtual object on the real world, for example, a real object and a real environment, that a user sees. A wearable electronic device, such as smart glasses or a head-mounted display device, may display an augmented reality image (or AR image). For example, smart glasses show a neighboring real object and real environment to a user through a display including a transparent lens. The smart glasses may display an image or a graphic object to be associated with the real object and the real environment through the display.

Aspects of the disclosure are to address at least the above-mentioned problems and/or disadvantages and to provide at least the advantages described below. Accordingly, an aspect of the disclosure is to provide a wearable electronic device for displaying a user interface including an AR image in association with an external electronic device, and a method for operating the same.

Additional aspects will be set forth in part in the description which follows and, in part, will be apparent from the description, or may be learned by practice of the presented embodiments.

Technical Solution

In accordance with an aspect of the disclosure, a wearable electronic device is provided. The wearable electronic device includes a camera, a communication circuit, a display including a transparent lens and displaying content through the lens, and a processor, wherein the processor may be configured to obtain first information about a first device indicated by a first object through the communication circuit when the first object is selected from among a plurality of objects for controlling devices displayed on an external electronic device, identify a first position for displaying the first information corresponding to the first object as an augmented reality image, based on a gaze direction of a user identified through the camera, identify a property of the augmented reality image, based on a user input, and control the display to display the augmented reality image having the property at the first position through the display.

In accordance with another aspect of the disclosure, an operating method of a wearable electronic device is provided. The operating method includes obtaining first information about a first device indicated by a first object through a communication circuit of the wearable electronic device when the first object is selected from among a plurality of objects for controlling devices displayed on an external electronic device, identifying a first position for displaying the first information corresponding to the first object as an augmented reality image, based on a gaze direction of a user identified through a camera of the wearable electronic device, identifying a property of the augmented reality image, based on a user input, and displaying the augmented reality image having the property at the first position through a display including a transparent lens included in the wearable electronic device.

A non-transitory recording medium storing a program, the program comprising instructions configured to, when executed by at least one processor of a wearable electronic device, cause the wearable electronic device to obtain first information about a first device indicated by a first object through a communication circuit of the wearable electronic device when the first object is selected from among a plurality of objects for controlling devices displayed on an external electronic device, identify a first position for displaying the first information corresponding to the first object as an augmented reality image, based on a gaze direction of a user identified through a camera included in the wearable electronic device, identifying a property of the augmented reality image, based on a user input, and display the augmented reality image having the property at the first position through a display including a transparent lens included in the wearable electronic device.

Advantageous Effects

A wearable electronic device according to an embodiment may display a user interface including an AR image on a display of the wearable electronic device so that a user may efficiently control a device to be controlled.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
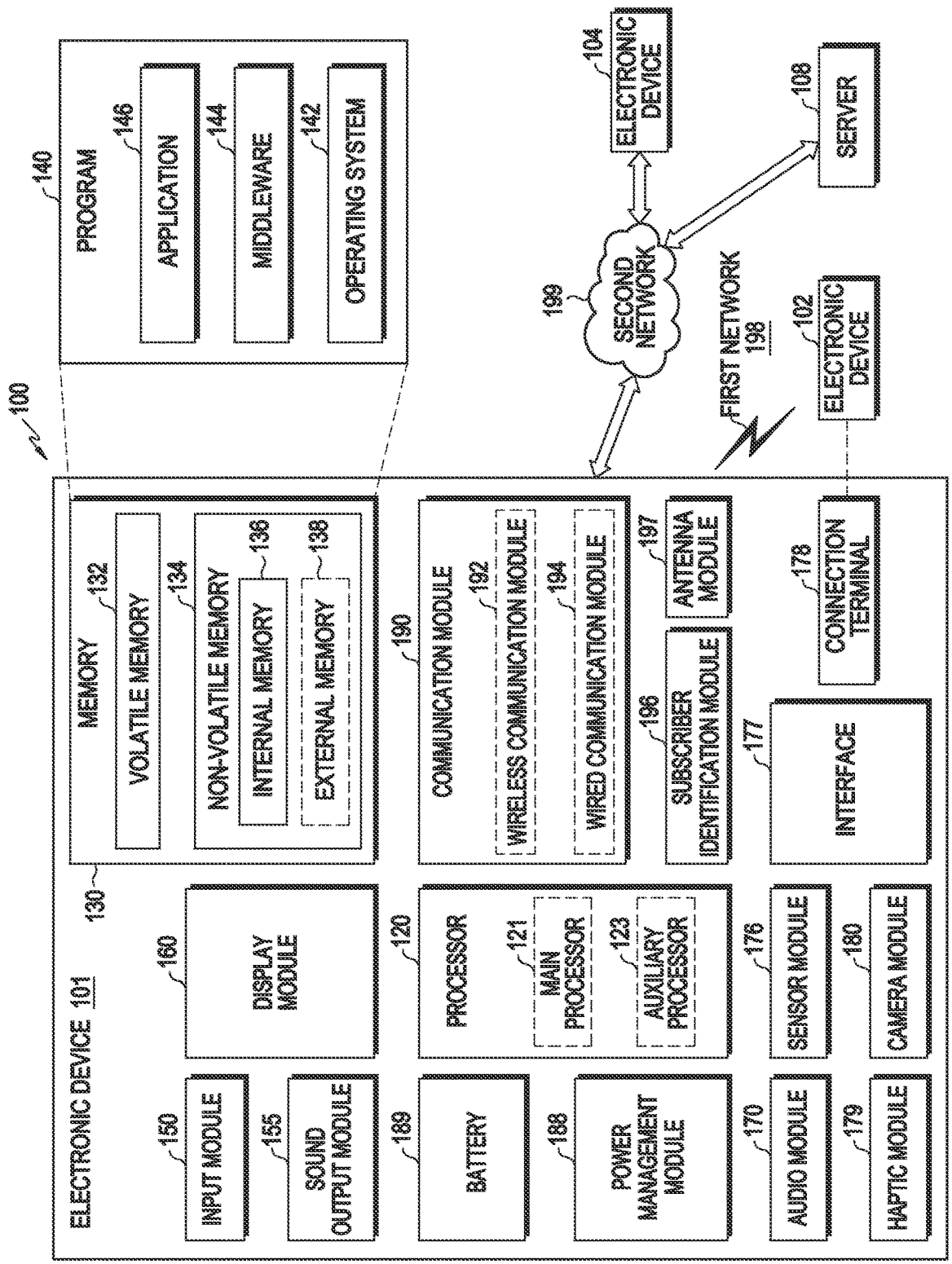
FIG. 1 is a block diagram of an electronic device in a network environment according to various embodiments of the disclosure.

FIG. 1 is a block diagram illustrating an electronic device 101 in a network environment 100 according to various embodiments of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing 1 eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
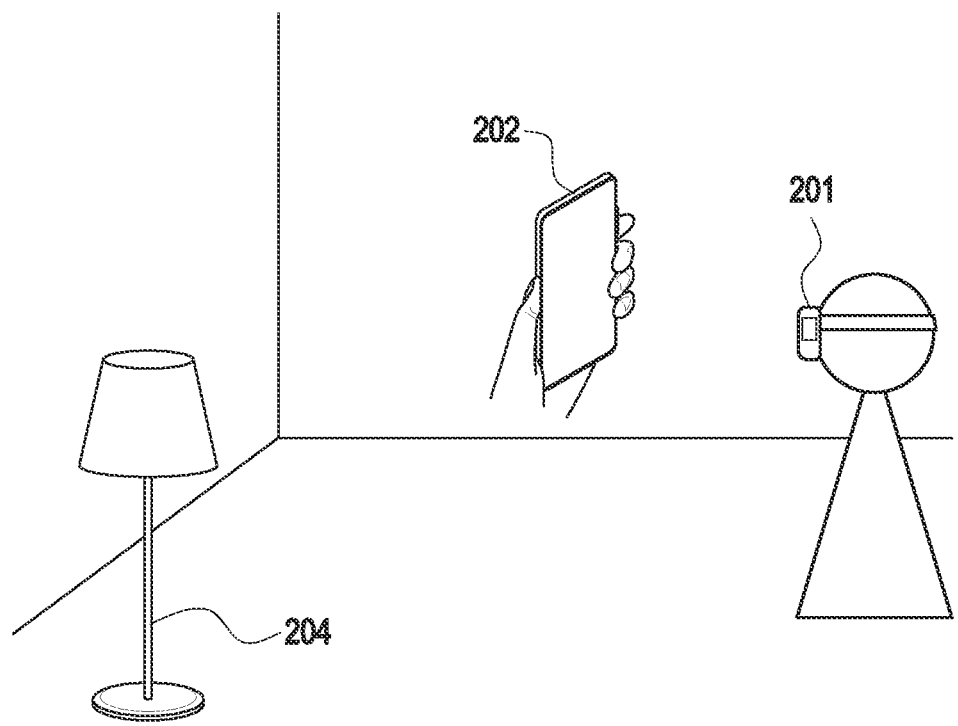
FIG. 2 illustrates an electronic system including a wearable electronic device and an external electronic device according to an embodiment of the disclosure.

FIG. 2 illustrates an electronic system including a wearable electronic device and an external electronic device according to an embodiment of the disclosure.

According to an embodiment, referring to FIG. 2, the electronic device may include the wearable electronic device 201, the external electronic device 202, and a device 204 to be controlled. For example, the electronic device may include the wearable electronic device 201, the external electronic device 202, and the device 204 to be controlled in a specific space. For example, the wearable electronic device 201 may be configured to be the same as or similar to the electronic device 101 of FIG. 1. The external electronic device 202 may be configured to be the same as or similar to the electronic device 102 of FIG. 1. Further, the device 204 to be controlled may be configured to be the same as or similar to the electronic device 104 of FIG. 1.

According to an embodiment, the wearable electronic device 201 may display an augmented reality (AR) image (or object) through a display including a transparent lens. For example, a user wearing the wearable electronic device 201 may see the AR image (or AR object) displayed by the wearable electronic device 201 along with an actual space through the display including the transparent lens. For example, the wearable electronic device 201 may be configured as smart glasses or a head-mounted display device.

According to an embodiment, the wearable electronic device 201 may display the AR image in association with the actual space and an actual object through the display including the transparent lens. For example, the wearable electronic device 201 may display information associated with the actual object as an AR image next to the actual object. Alternatively, the wearable electronic device 201 may display information not associated with the actual object as an AR image next to the actual object. For example, the wearable electronic device 201 may display the AR image in a closed space of an open space (e.g., the air) and the closed space (e.g., a wall, a floor, or a specific object) included in the actual space through the display including transparent lens. The wearable electronic device 201 may display the AR image such that the AR image is seen to be fixed at a specific position by the user.

According to an embodiment, the wearable electronic device 201 may display the information associated with the actual object as the AR image next to the actual object through a display (e.g., a projector) of an electronic device connected via wireless communication, in addition to the display connected to the wearable electronic device 201 in a hardware manner.

According to an embodiment, the wearable electronic device 201 may obtain three-dimensional (3D) space information about the actual space through a sensor and/or a camera included in the wearable electronic device 201. For example, the wearable electronic device 201 may obtain coordinate information about the actual space, based on the 3D space information.

According to an embodiment, the wearable electronic device 201 may obtain information about the user's gesture input, a direction which the user's head faces, a direction which the user's gaze faces, and the user's blinking through the sensor and/or the camera included in the wearable electronic device 201.

According to an embodiment, the external electronic device 202 may perform wireless or wired communication with the wearable electronic device 201. For example, the external electronic device 202 may transmit and receive data to and from the wearable electronic device 201 wirelessly or by wire. For example, the external electronic device 202 may be configured as a smartphone, a smart tablet, or a smart watch.

According to an embodiment, the device 204 to be controlled may include a device capable of performing a wired/wireless communication function. For example, the device 204 to be controlled may perform an operation corresponding to a command according to the command received from the outside (e.g., the wearable electronic device 201 or the external electronic device 202) through the wired/wireless communication function. For example, the device 204 to be controlled may be configured as a home device (e.g., a smart light bulb, a smart air conditioner, a robot vacuum cleaner, a smart window, a smart door, a smart curtain, a smart home appliance, or a smart light). For example, the wearable electronic device 201 or the external electronic device 202 may display information about the device 204 to be controlled. The wearable electronic device 201 or the external electronic device 202 may transmit a command (e.g., or a control signal) to control the device 204 to be controlled to the device 204 to be controlled, based on a user input with respect to the information. The device 204 to be controlled may perform a function and/or an operation corresponding to the command. For example, the device 204 to be controlled may be configured as a home device (e.g., a smart light bulb, a smart air conditioner, a robot vacuum cleaner, a smart window, a smart door, a smart curtain, a smart home appliance, or a smart light).

Figure 3A:
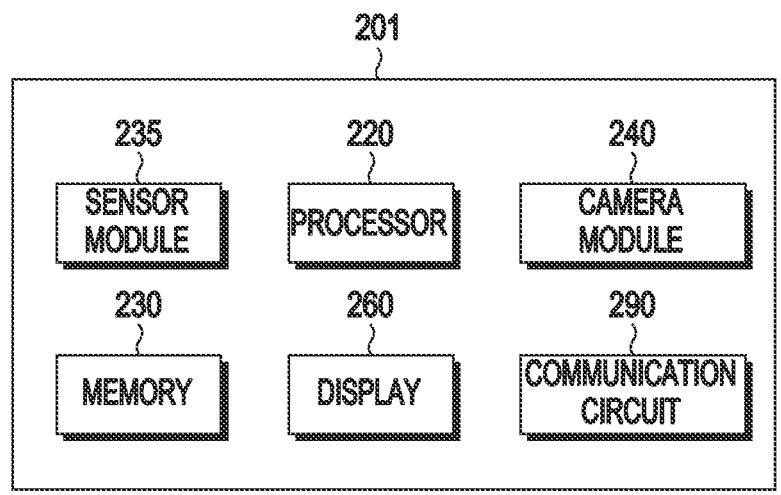
FIG. 3A is a schematic block diagram of a wearable electronic device according to an embodiment of the disclosure.

FIG. 3A is a schematic block diagram of a wearable electronic device according to an embodiment of the disclosure.

According to an embodiment, referring to FIG. 3A, the wearable electronic device 201 may include a processor 220, a memory 230 (e.g., the memory 130 of FIG. 1), a sensor module 235 (e.g., the sensor module 176 of FIG. 1), a camera module 240 (e.g., the camera module 140 of FIG. 1), a display 260 (e.g., the display module 160 of FIG. 1), and a communication circuit 290 (e.g., the communication module 190 of FIG. 1).

According to an embodiment, the processor 220 may control an overall operation of the wearable electronic device 201. For example, the processor 220 may be configured to be the same as or similar to the processor 120 of FIG. 1.

According to an embodiment, the processor 220 may select at least one object from among a plurality of objects for controlling devices displayed on an external electronic device 202. For example, when a first object is selected from among the plurality of objects by a user input to the external electronic device 202 (e.g., a touch input, a gesture input, or a voice input to the external electronic device 202), the processor 220 may receive information indicating selection of the first object and first information about a first device (e.g., the device 204 to be controlled of FIG. 2) indicated by the first object from the external electronic device 202 through the communication circuit 290 (e.g., the communication module 190 of FIG. 1). For example, the information indicating that the selection of the first object may be included in the first information about the first device.

According to an embodiment, when identifying that a user gazes at the first object displayed on the external electronic device 202 for a specified time through the sensor module 235 and/or the camera module 240, the processor 220 may select the first object and may receive the first information corresponding to the selected first object. The processor 220 may transmit information indicating the selection of the first object to the external electronic device 202. Further, the processor 220 may request the external electronic device 202 to transmit the first information about the first device indicated by the first object.

According to an embodiment, the processor 220 may identify an identifier (ID) of the first object (e.g., an identifier, such as an icon, a quick response (QR) code, an ID, or an infrared signal, included in the first object) displayed on the external electronic device 202 through the sensor module 235 and/or the camera module 240, and may identify whether the user gazes at the first object using the identified identifier. For example, the processor 220 may share an identifier display rule for security with the external electronic device 202. For example, the processor 220 may identify the position of the identifier included in the first object, based on the identifier display rule. The position of the identifier may be changed according to the identifier display rule. For example, the position of the identifier may be sequentially (or regularly) changed to the upper left, lower right, and upper right of the first object according to the identifier display rule. For example, when identifiers displayed in the first object are sequentially displayed according to positions determined according to the identifier display rule for a specified time, the processor 220 may select the first object. According to another embodiment, the position of the identifier may be changed by each frame in which the first object is displayed according to the identifier display rule. For example, the identifier may be displayed at a first specific position in 1st, 5th, 10th, and 25th frames and may be displayed at a second specific position in 3rd, 8th, 13th, and 28th frames according to the identifier display rule.

According to an embodiment, the processor 220 may generate a plurality of identifiers and may transmit the plurality of generated identifiers to the external electronic device 202. The processor 220 may request the external electronic device 202 to include an identifier corresponding to each of a plurality of objects for controlling a plurality of devices displayed on the external electronic device (or to display the identifier at a position specified for each of the objects).

According to an embodiment, when the first object is selected from among the plurality of objects for controlling the devices displayed on the external electronic device 202, the processor 220 may obtain the first information about the first device indicated by the first object through the communication circuit 290. For example, the processor 220 may obtain the first information about the first device from a server or the external electronic device 202 through the communication circuit 290. Alternatively, when the first information about the first device indicated by the first object is previously stored in the memory 230, the processor 220 may obtain the first information about the first device from the memory 230. For example, the first information about the first device may include information about the first device 204 (e.g., state information about the first device 204) and information for controlling the first device (e.g., information about a command to control the first device and user interface information about a control menu).

According to an embodiment, the wearable electronic device 201 may obtain 3D space information about a real space through the sensor module 240 and/or the camera module 250 (e.g., a depth camera) included in the wearable electronic device 201. For example, the wearable electronic device 201 may obtain coordinate information about the real space, based on the 3D space information.

According to an embodiment, the processor 220 may identify a gaze direction of the user through the sensor module 235 and/or the camera module 240. The processor 220 may identify a first position for displaying the first information corresponding to the first object (or the first device) as an augmented reality image, based on the identified gaze direction of the user. For example, the processor 220 may identify the first position (or the coordinates of the first position) using the coordinate information about the real space. For example, the first position may be included in an actual space where the user is positioned. For example, the processor 220 may determine, as the first position, a position indicated by the gaze direction of the user in a closed space (e.g., a wall, a floor, or an object) included in the space where the user is positioned. For example, when a touch input, a gesture input (e.g., a gesture by the user's hand, eye, or eyebrow), or a voice to determine the position of the user is identified, the processor 220 may determine, as the first position, a position indicated by the gaze direction of the user at a corresponding time point.

According to an embodiment, the processor 220 may determine a property of the augmented reality image, based on a user input. For example, the user input may include at least one of a touch input, a gesture input, and a voice to the wearable electronic device 201. Further, the user input may include at least one of a touch input, a gesture input, and a voice to the external electronic device 202. For example, the processor 220 may adjust at least one of the size, form, shape, transparency, slope, direction, color, or position of the augmented reality image, based on the user input. For example, the processor 220 may determine a user input to adjust the property of the augmented reality image by comparing the user's gesture (or gesture input) identified through the sensor module 235 with a specified gesture. For example, the processor 220 may determine a user input to adjust the property of the augmented reality image, based on an input to the external electronic device 202.

According to an embodiment, the processor 220 may display the augmented reality image having the property determined by the user input at the first position through the display 260. For example, the processor 220 may display the augmented reality image to be fixed at the first position. That is, even though the position of the user is changed, the user may see the augmented reality image at the first position through a transparent lens of the display 260.

According to an embodiment, the processor 220 may identify a user input for the augmented reality image. Further, the processor 220 may control the first device, based on a user input for the augmented reality image.

According to an embodiment, the camera module 240 may include a plurality of cameras. For example, the camera module 240 may include a camera for tracking a hand and a camera for tracking an eye. Further, the camera module 240 may include a depth camera.

Figure 3B:
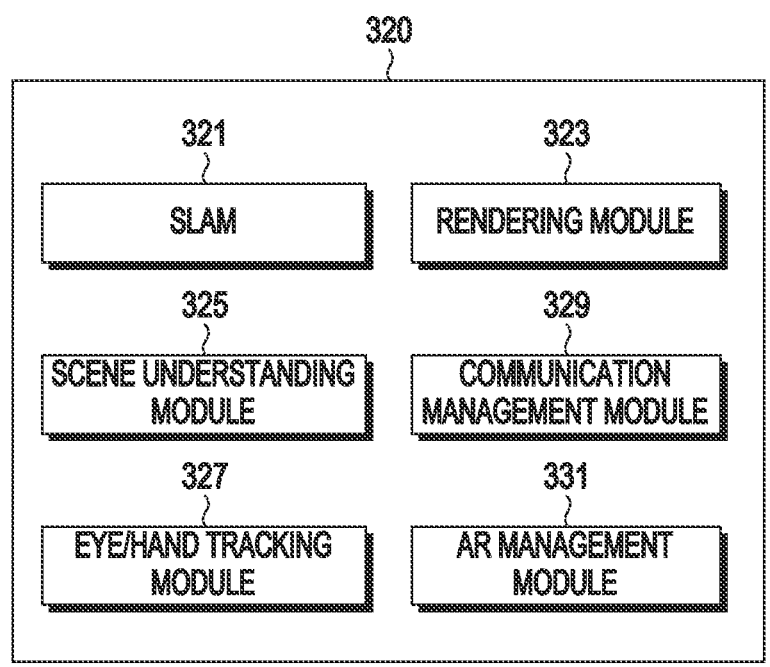
FIG. 3B is a schematic block diagram of modules executed in a wearable electronic device according to an embodiment of the disclosure.

FIG. 3B is a schematic block diagram of modules executed in a wearable electronic device according to an embodiment of the disclosure.

According to an embodiment, referring to FIG. 3B, a program module 320 may include a SLAM 321, a rendering module 323, a scene understanding module 325, an eye/hand tracking module 327, a communication management module 329, and an AR management module 331. For example, the program module 320 may be executed by the processor 220.

According to an embodiment, the SLAM 321 may include a module that performs spatial modeling based on a real space and position tracking of the wearable electronic device 201 to display a virtual object (or AR image) in a real space around the wearable electronic device 201. The SLAM 321 may use information obtained from a depth camera included in a camera module 240 and a sensor module 235. The SLAM 321 may generate 3D information about the real space around the wearable electronic device 201, based on the obtained information, and may continuously update the 3D information, based on a position tracking result.

According to an embodiment, the rendering module 323 may include a module that displays a virtual object (or AR image) to look natural on a display 260 of the wearable electronic device 201 and continuously updates display of the virtual object (or AR image) according to a movement of the wearable electronic device 201. For example, the rendering module 323 may display the virtual object (or AR image) so that the virtual object (or AR image) may be seen by a user as being fixed at a specific position like an existing object even though the user moves or shifts gaze thereof.

According to an embodiment, the scene understanding module 325 may include a module that identifies an area corresponding to a wall or a floor included in the real space, based on information obtained from the depth camera included in the camera module 240, and identifies furniture or an object included in the real space.

According to an embodiment, the eye/hand tracking module 327 may include a module that generates an input to a multi-modal for naturally and effectively controlling a virtual object (or AR image) using information obtained from the camera module 240.

According to another embodiment, the communication management module 329 may include a module that controls a function of communication with an external device (e.g., an external electronic device 202 and a device 204 to be controlled) through various wireless communication technologies supported by a communication circuit 290.

According to an embodiment, the AR management module 331 may include a module that controls the function of communication with the external device (e.g., the external electronic device 202 and the device 204 to be controlled) or manages an AR service of the wearable electronic device 201. Further, the AR management module 331 may include a module that controls a function of performing some functions among functions of the foregoing modules in the external device or offloading the functions. The AR management module 331 may provide the user with first information about the device 204 to be controlled as an AR image through the display 260. The AR management module 331 may identify a user input with respect to the first information displayed as the AR image, and may transmit a command to the device 204 to be controlled so that the device 204 to be controlled performs a function corresponding to the user input.

At least some of the foregoing operations of the wearable electronic device 201 may be performed by a processor 220. However, for convenience of description, the operations will be described as being performed by the wearable electronic device 201 hereinafter.

Figure 4:
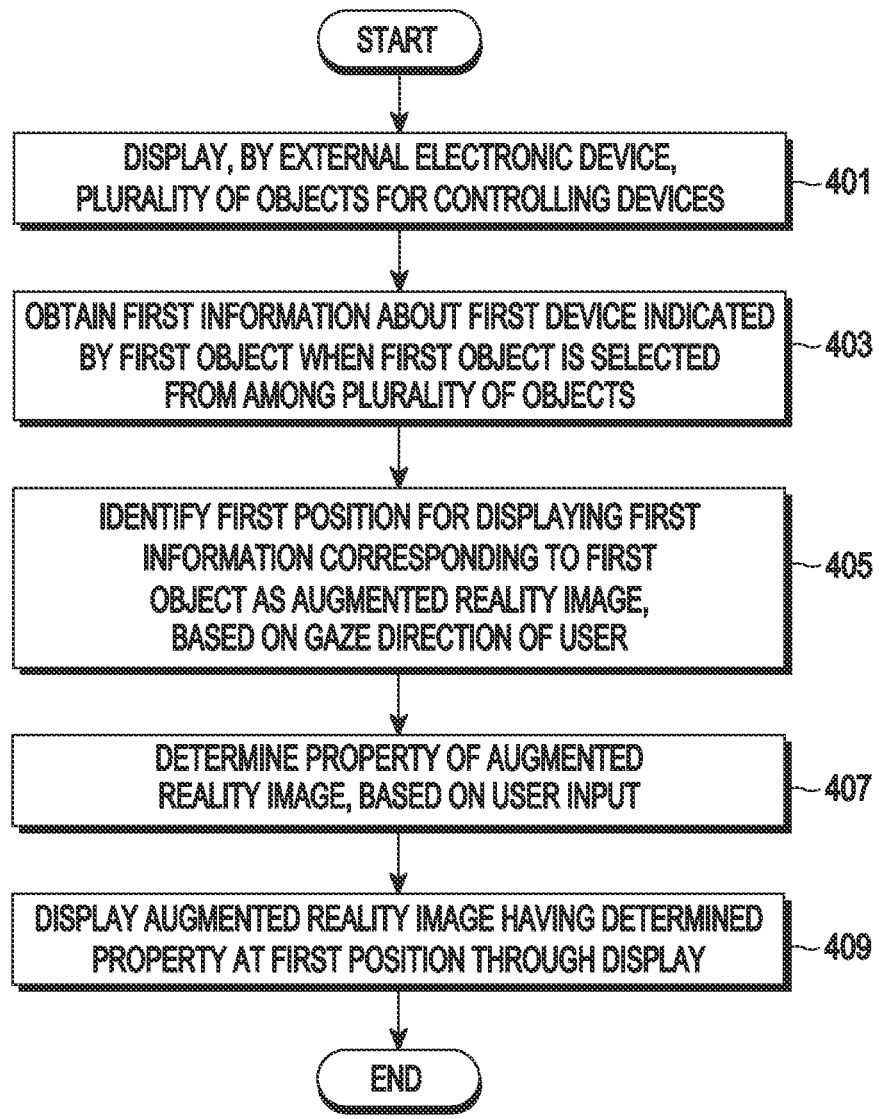
FIG. 4 is a flowchart illustrating an operating method of a wearable electronic device according to an embodiment of the disclosure.

FIG. 4 is a flowchart illustrating an operating method of a wearable electronic device according to an embodiment of the disclosure.

Referring to FIG. 4, according to an embodiment, in operation 401, an external electronic device (e.g., the external electronic device 202 of FIG. 2) may display a plurality of objects for controlling devices to be controlled (e.g., the device 204 to be controlled of FIG. 2).

According to an embodiment, in operation 403, when a first object is selected from among the plurality of objects displayed on the external electronic device, a wearable electronic device (e.g., the wearable electronic device 201 of FIGS. 2 and 3A) may obtain first information about a first device (e.g., the device 204 to be controlled of FIG. 2) indicated by the first object. For example, the first object may be selected by a user input (e.g., a touch input, a gesture input, or a voice input) to the external electronic device. Alternatively, when the wearable electronic device identifies that a user gazes at the first object for a specified time, the first object may be selected by a signal transmitted from the wearable electronic device to the external electronic device. The wearable electronic device may obtain the first information from a server, the external electronic device, or a memory (e.g., the memory 230 of FIG. 3A).

According to an embodiment, in operation 405, the wearable electronic device may identify a first position for displaying the first information corresponding to the first object as an augmented reality image, based on a gaze direction of the user identified through a sensor module (e.g., the sensor module 235 of FIG. 3A) and/or a camera module (e.g., the camera module 240 of FIG. 3A).

According to an embodiment, in operation 407, the wearable electronic device may determine a property of the augmented reality image, based on a user input. For example, the wearable electronic device may determine at least one of the size, form, shape, transparency, slope, direction, color, and position of the augmented reality image, based on the user input.

According to an embodiment, in operation 409, the wearable electronic device may display the augmented reality image having the determined property at the first position through a display (e.g., the display 260 of FIG. 3A). For example, the wearable electronic device may display the augmented reality image to be fixed at the first position through the display. After the augmented reality image is displayed at the first position, the wearable electronic device may adjust at least one of the size, form, shape, transparency, slope, direction, color, and position of the augmented reality image through an additional user input.

Figure 5:
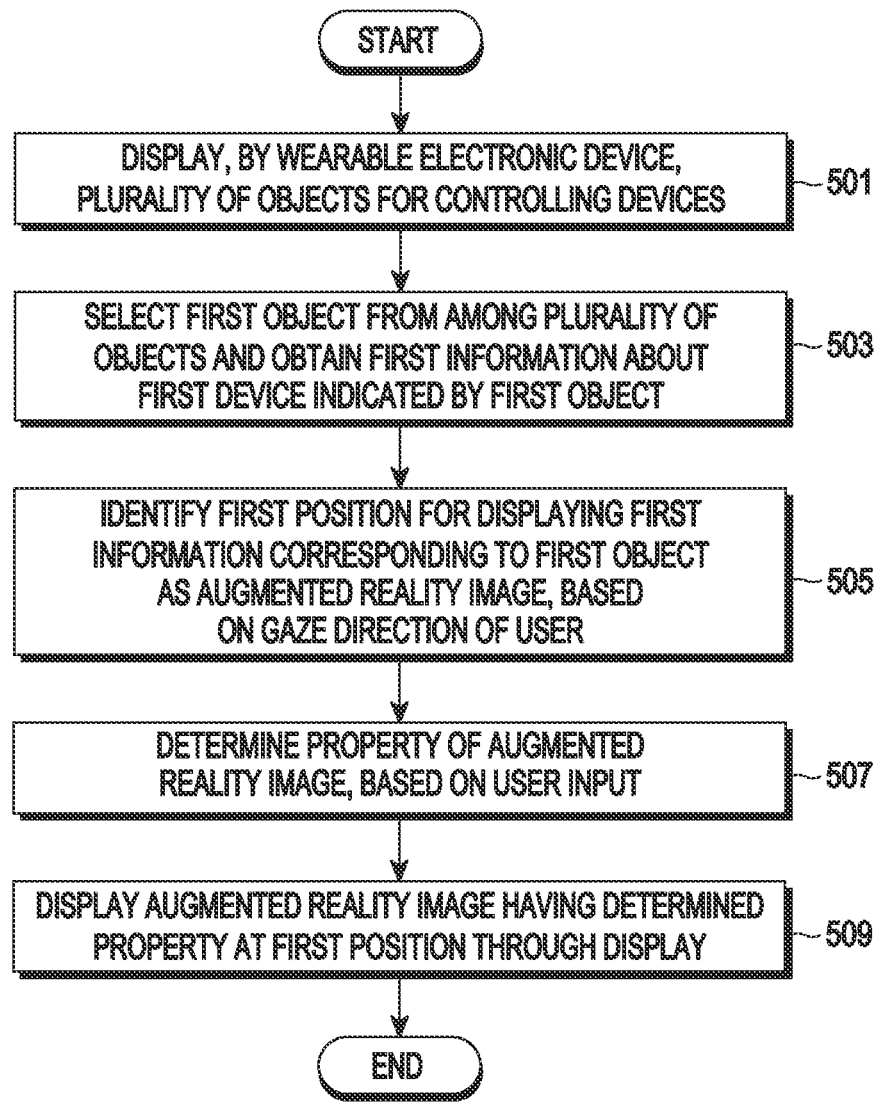
FIG. 5 is a flowchart illustrating an operating method of a wearable electronic device according to an embodiment of the disclosure.

FIG. 5 is a flowchart illustrating an operating method of a wearable electronic device according to an embodiment of the disclosure.

Referring to FIG. 5, according to an embodiment, in operation 501, the wearable electronic device (e.g., the wearable electronic device 201 of FIG. 2 and FIG. 3A) may display a plurality of objects for controlling devices to be controlled through a display (e.g., the display 260 of FIG. 3A) including a transparent lens. For example, the plurality of objects may be displayed as virtual images through the display.

According to an embodiment, in operation 503, the wearable electronic device may select a first object from among the plurality of objects displayed through the display, and may obtain first information about a first device indicated by the selected first object. For example, the first object may be selected by a user input (e.g., a touch input, a gesture input, or a voice input) to the wearable electronic device. Alternatively, when the wearable electronic device 201 identifies that a user gazes at the first object for a specified time, the first object may be selected by the wearable electronic device. The wearable electronic device may obtain the first information from a server, an external electronic device (e.g., the external electronic device 202 of FIG. 2), or a memory (e.g., the memory 230 of FIG. 3A).

According to an embodiment, in operation 505, the wearable electronic device may identify a first position for displaying the first information corresponding to the first object as an augmented reality image, based on a gaze direction of the user identified through a sensor module (e.g., the sensor module 235 of FIG. 3A) and/or a camera module (e.g., the camera module 240 of FIG. 3A).

According to an embodiment, in operation 507, the wearable electronic device may determine a property of the augmented reality image, based on a user input. For example, the wearable electronic device may determine at least one of the size, form, shape, transparency, slope, direction, color, and position of the augmented reality image, based on the user input.

According to an embodiment, in operation 509, the wearable electronic device may display the augmented reality image having the determined property at the first position through the display. After the augmented reality image is displayed at the first position, the wearable electronic device may adjust at least one of the size, form, shape, transparency, slope, direction, color, and position of the augmented reality image through an additional user input.

Figure 6A:
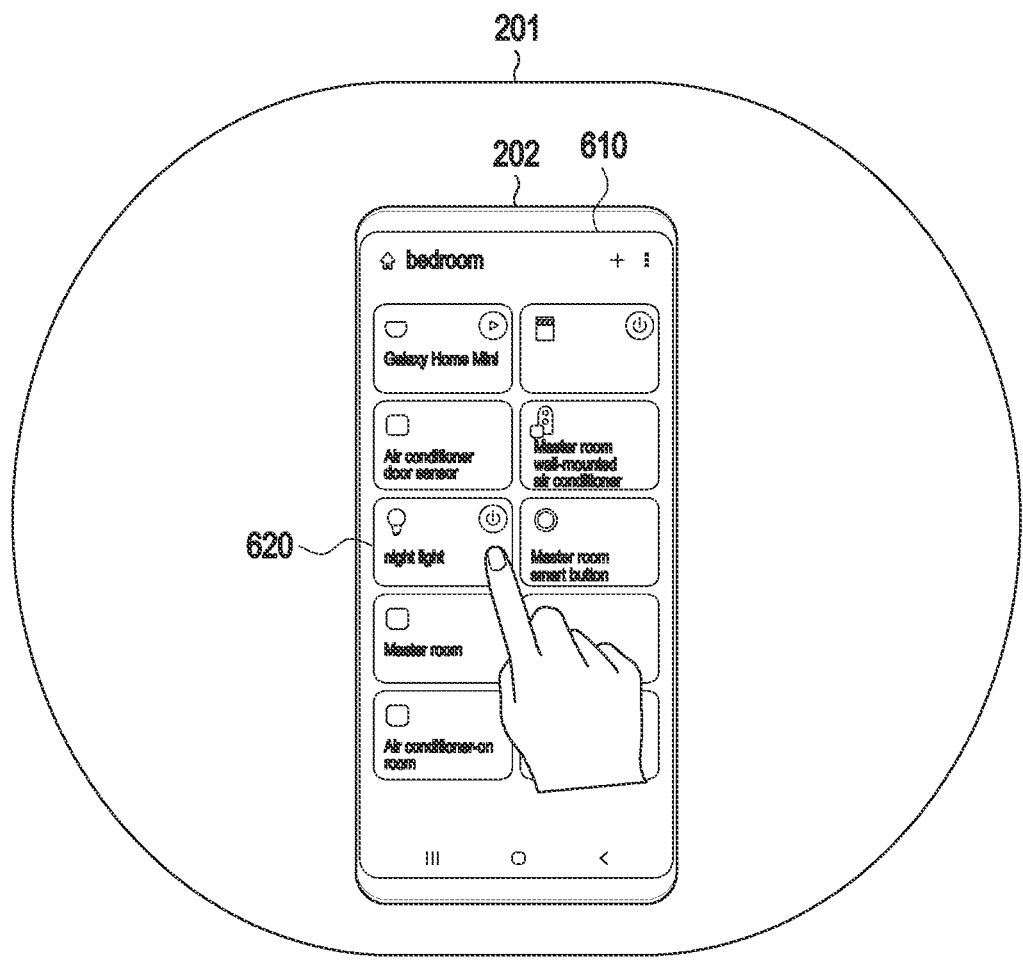
FIGS. 6A and 6B illustrate an operation in which a wearable electronic device selects one of a plurality of objects displayed on an external electronic device according to an embodiment of the disclosure.
Figure 6B:
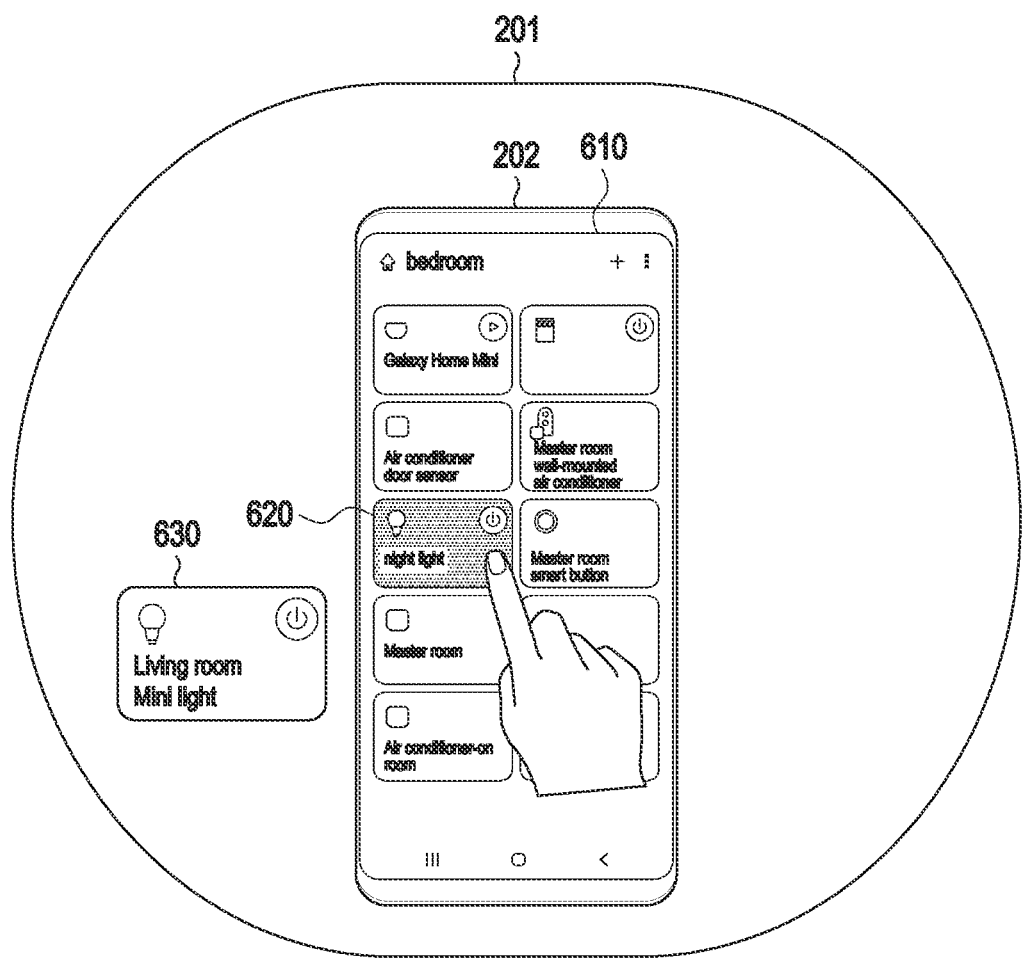

FIGS. 6A and 6B illustrate an operation in which a wearable electronic device selects one of a plurality of objects displayed on an external electronic device according to an embodiment of the disclosure.

Referring to FIG. 6A, according to an embodiment, the external electronic device 202 may display a first screen 610 including a plurality of objects for controlling devices to be controlled. For example, the first screen 610 may be an execution screen of an application for controlling devices to be controlled (e.g., the device 204 to be controlled of FIG. 2).

According to an embodiment, the external electronic device 202 may identify a user input (e.g., a touch input, a gesture input, or a voice input) to select a first object 620 from among the plurality of objects. The external electronic device 202 may transmit first information about a first device (e.g., the device 204 to be controlled of FIG. 2) corresponding to the first object to the wearable electronic device 201, based on the user input.

According to an embodiment, when a user is identified as gazing at the first object 620 for a specified time, the wearable electronic device 201 may transmit a signal indicating selection of the first object 620 to the external electronic device 202. The external electronic device 202 may transmit the first information about the first device (e.g., the device 204 to be controlled of FIG. 2) corresponding to the first object 620 to the wearable electronic device 201, based on the transmitted signal.

Referring to FIG. 6B, the wearable electronic device 201 may display an augmented reality image 630, based on the first information about the first device received from the external electronic device 202. For example, the augmented reality image 630 may include information (e.g., information indicating a name, position, or state) about the first device and a menu (e.g., a user interface) for controlling the first device corresponding to the first object 620. The wearable electronic device 201 may obtain the first information about the first device 204 from an external server or a memory (e.g., the memory 230 of FIG. 3A).

Figure 7A:
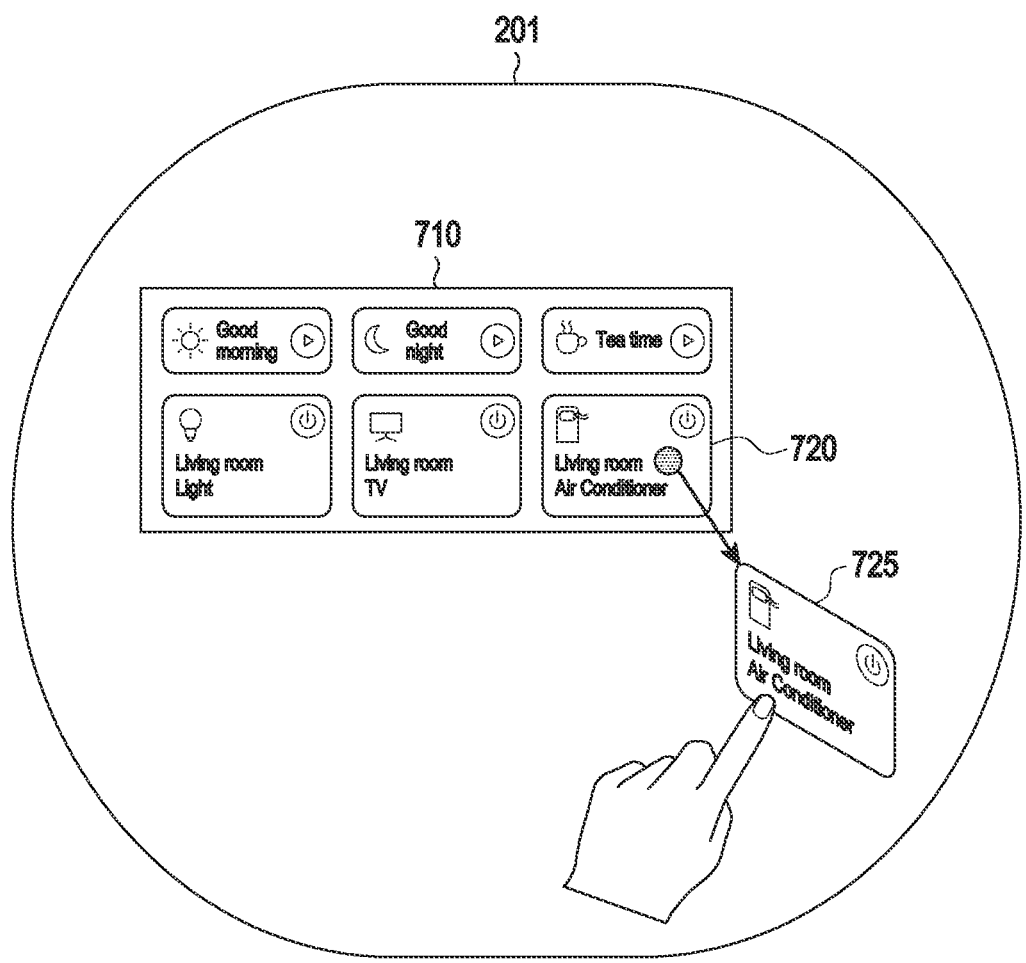
FIGS. 7A and 7B illustrate an operation in which a wearable electronic device selects one of a plurality of objects displayed on a display according to an embodiment of the disclosure.
Figure 7B:
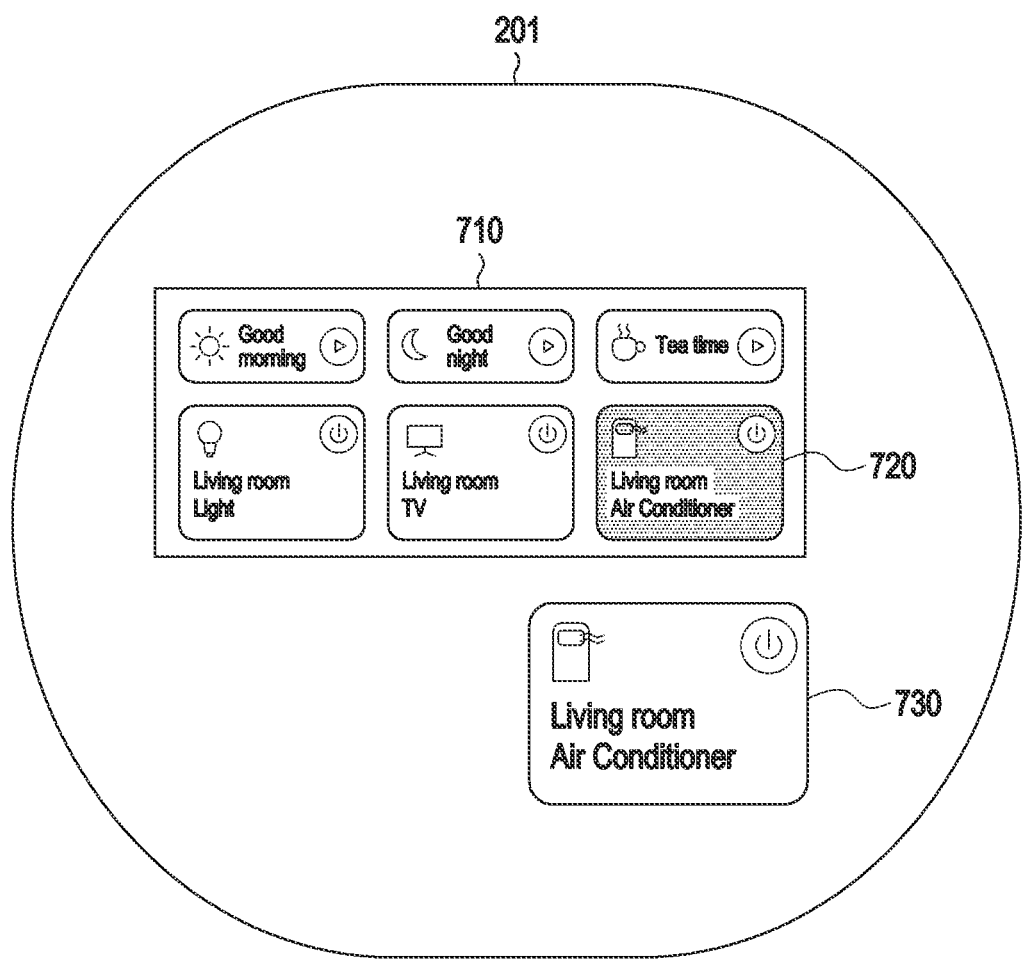

FIGS. 7A and 7B illustrate an operation in which a wearable electronic device selects one of a plurality of objects displayed on a display according to an embodiment of the disclosure.

Referring to FIG. 7A, according to an embodiment, the wearable electronic device 201 may display a first screen 710 including a plurality of objects for controlling devices to be controlled (e.g., the device 204 to be controlled of FIG. 2) through a display (e.g., the display 260 of FIG. 3A). For example, the first screen 710 may be an execution screen of an application for controlling devices to be controlled.

According to an embodiment, the wearable electronic device 201 may identify a user input (e.g., a gesture input or a voice input) to select a second object 720 from among the plurality of objects. For example, the wearable electronic device 201 may select the second object 720, based on a gesture input of pulling the second object 720 and may display a graphic object 725 corresponding to the second object 720. The wearable electronic device 201 may obtain second information about a second device indicated by the second object 720, based on a user input.

According to an embodiment, the wearable electronic device 201 may identify whether a user gazes at the second object 720 for a specified time through a sensor module (e.g., the sensor module 235 of FIG. 3A) and/or a camera module (e.g., the camera module 240 of FIG. 3A). The wearable electronic device 201 may select the second object 720 from among the plurality of objects when the user is identified as gazing at the second object 720 for the specified time.

Referring to FIG. 7B, the wearable electronic device 201 may display an augmented reality image 730, based on the second information corresponding to the second object 720. For example, the augmented reality image 730 may include information (e.g., information indicating a name, position, or state) about the second device and a menu for controlling the second device.

Figure 8:
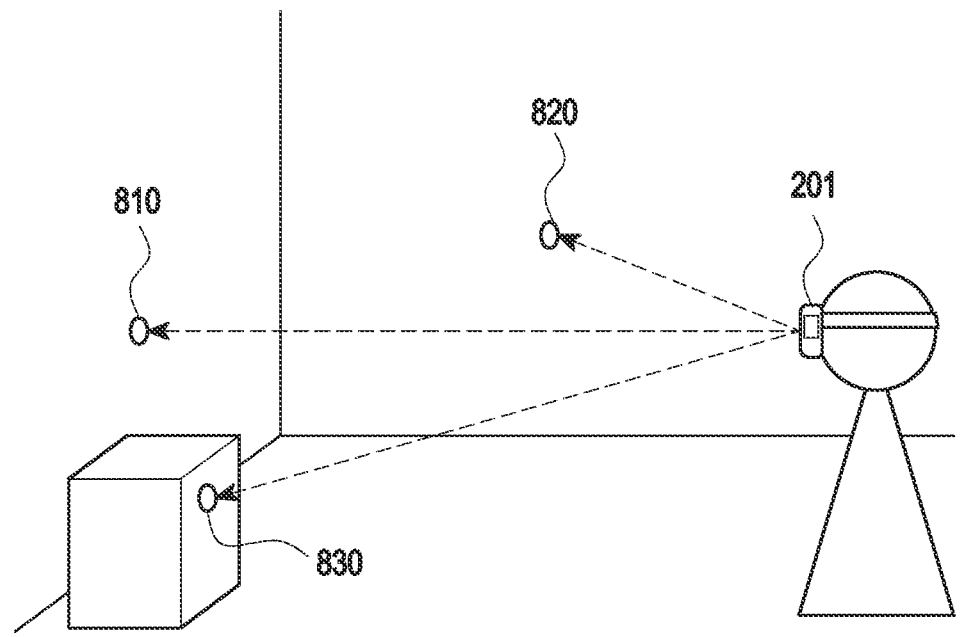
FIG. 8 illustrates an operation in which a wearable electronic device determines a position for displaying information about a device indicated by a selected object according to an embodiment of the disclosure.

FIG. 8 illustrates an operation in which a wearable electronic device determines a position for displaying information about a device indicated by a selected object according to an embodiment of the disclosure.

Referring to FIG. 8, according to an embodiment, the wearable electronic device 201 may determine a position for displaying information on a device to be controlled (e.g., the device 204 to be controlled of FIG. 2) that is indicated by a selected object as an augmented reality image. The wearable electronic device 201 may determine a first position for displaying the augmented reality image, based on a gaze direction of a user.

According to an embodiment, the wearable electronic device 201 may identify a closed space (e.g., a wall, a floor, or an object) positioned at a location to which the gaze of the user is directed in an actual space where the user is positioned. For example, the wearable electronic device 201 may display the augmented reality image at a first position 810 to which the gaze of the user is directed among the first position 810, a second position 820, and a third position 830. For example, since the second position 820 is an open position (e.g., the air), the wearable electronic device 201 may not display the augmented reality image at the position 820. Further, since the third position 830 does not match the gaze direction of the user, the wearable electronic device 201 may not display the augmented reality image at the position 830.

Figure 9A:
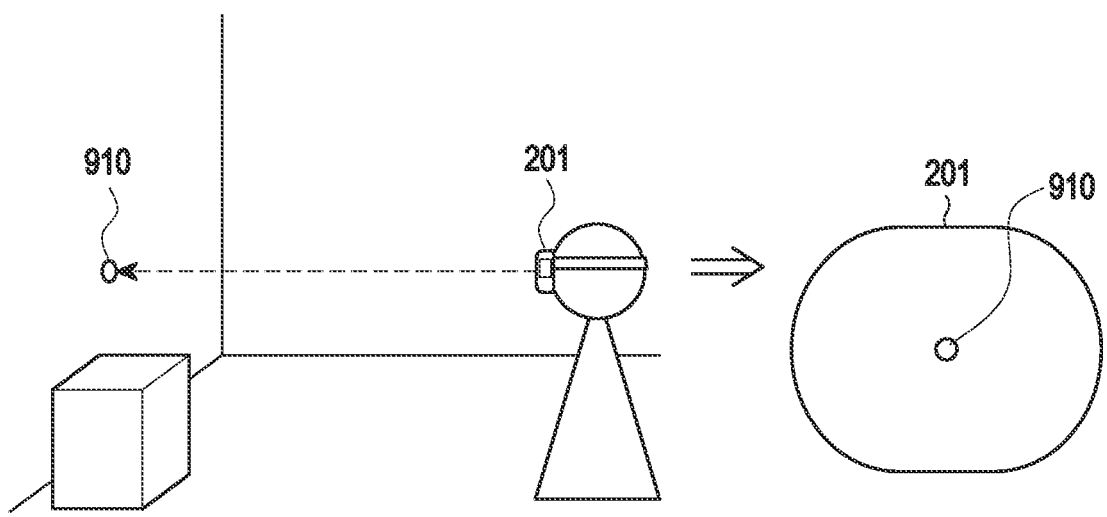
FIGS. 9A, 9B, and 9C illustrate an operation in which a wearable electronic device displays an image showing a path between a first position in which an augmented reality image is displayed and the wearable electronic device according to an embodiment of the disclosure.
Figure 9B:
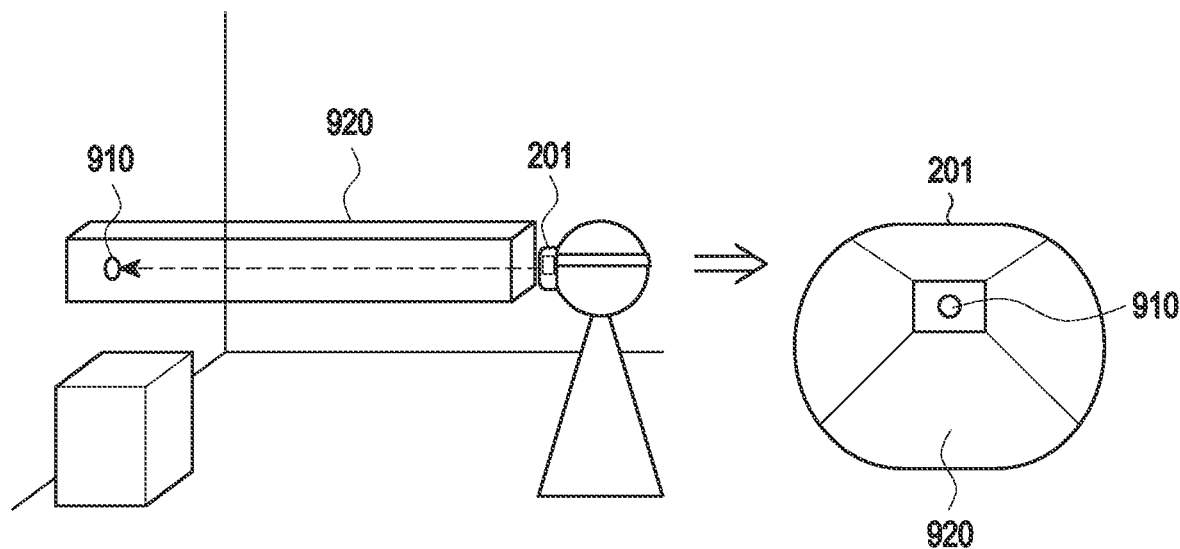
Figure 9C:
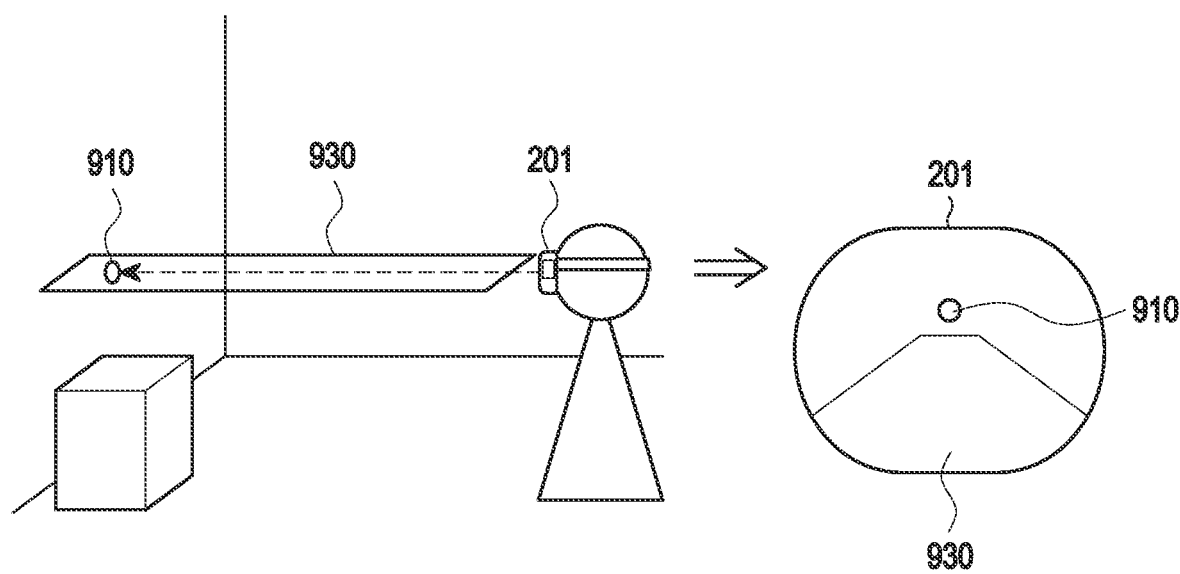

FIGS. 9A, 9B, and 9C illustrate an operation in which a wearable electronic device displays an image showing a path between a first position in which an augmented reality image is displayed and the wearable electronic device according to an embodiment of the disclosure.

According to an embodiment, the wearable electronic device 201 may identify the distance between a point 910 at which a user gazes and the wearable electronic device 201 and coordinate information about the point 910 through a sensor module (e.g., the sensor module 235 of FIG. 3A) and/or a camera module (e.g., the camera module 240 of FIG. 3A). The wearable electronic device 201 may identify a path between the point 910 at which the user gazes and the wearable electronic device 201, based on a space to which the user's gaze is directed and 3D spatial information. The wearable electronic device 201 may determine a first position 910 for displaying an augmented reality image, based on the coordinate information about the point 910 and/or the path between the point 910 and the wearable electronic device 201.

Referring to FIG. 9A, according to an embodiment, the wearable electronic device 201 may not display an image showing the path. The wearable electronic device 201 may display an object indicating the first position 910 through a display (e.g., the display 260 of FIG. 3A).

Referring to FIGS. 9B, and 9C, according to an embodiment, the wearable electronic device 201 may display an image 920 or 930 showing the path between the first position 910 at which the augmented reality image is displayed and the wearable electronic device 201. For example, the wearable electronic device 201 may display a first image 920 showing the path between the first position 910 and the wearable electronic device 201 in three dimensions. Alternatively, the wearable electronic device 201 may display a second image 930 showing the path between the first position 910 and the wearable electronic device 201 in a two-dimensional plane. The forms and shapes of the first image 920 and the second image 930 in FIGS. 9B and 9C are merely for illustration, and technical features of the disclosure may not be limited thereto.

Figure 10A:
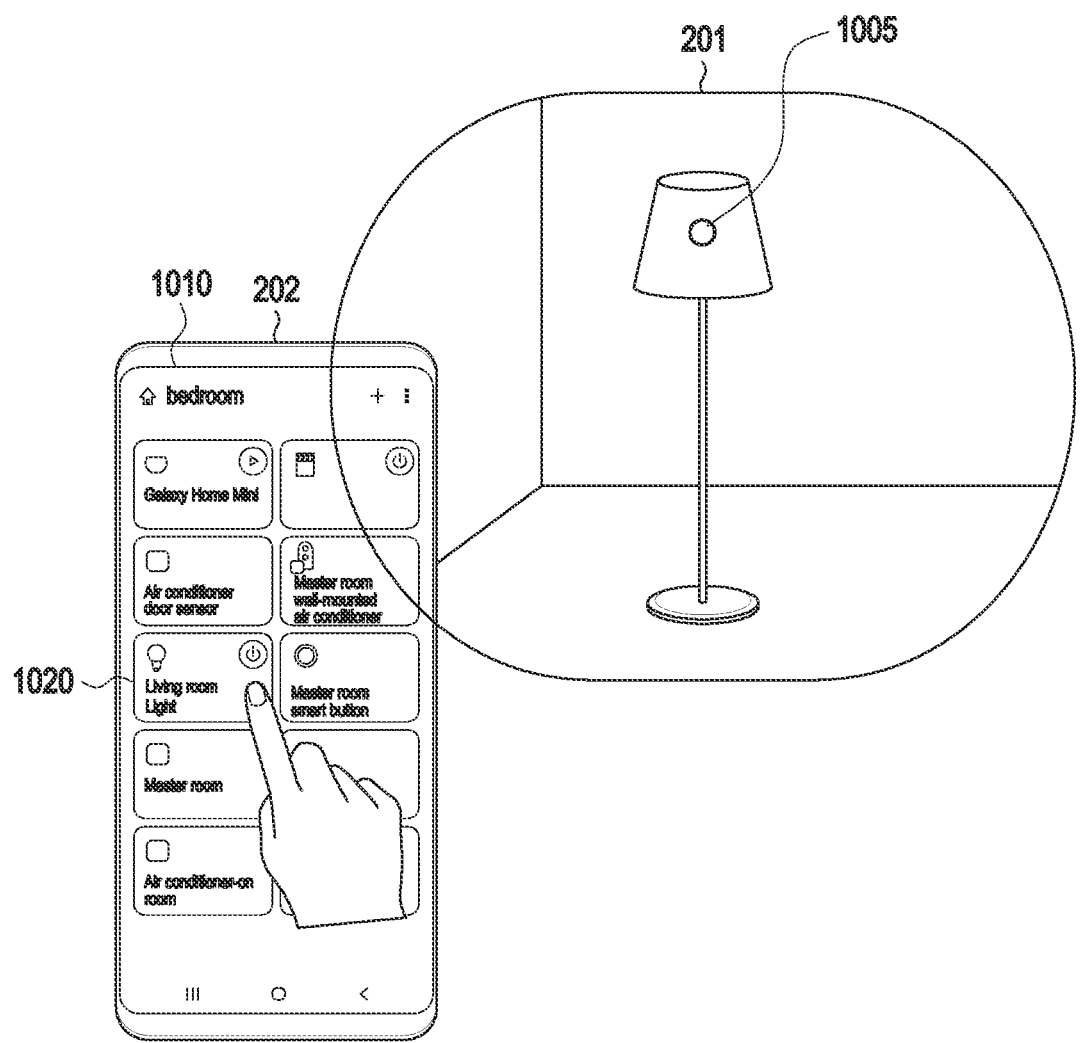
FIGS. 10A, 10B, and 10C illustrate an operation in which a wearable electronic device displays information about a device indicated by a selected object according to an embodiment of the disclosure.
Figure 10B:
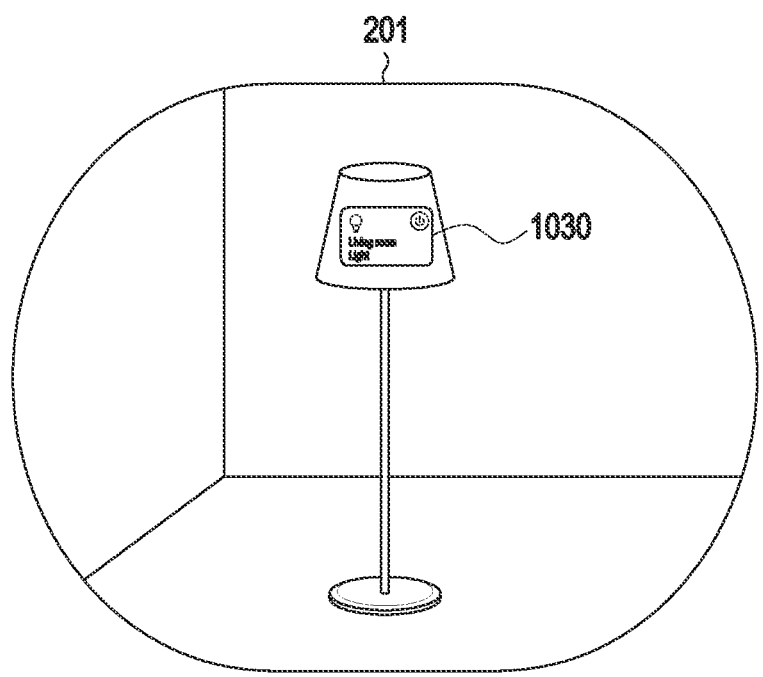
Figure 10C:
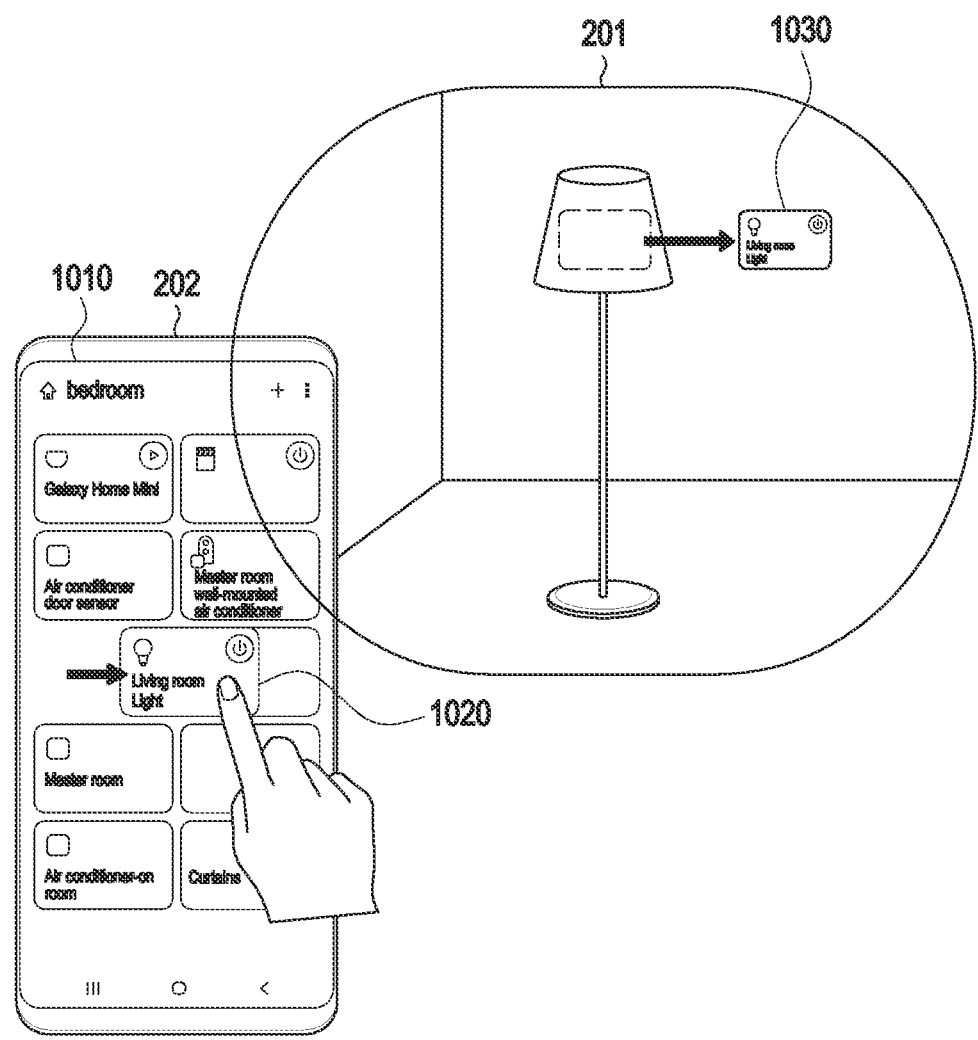

FIGS. 10A, 10B, and 10C illustrate an operation in which a wearable electronic device displays information about a device indicated by a selected object according to an embodiment of the disclosure.

Referring to FIG. 10A, according to an embodiment, an external electronic device 202 may display a first screen 1010 including a plurality of objects for controlling devices to be controlled. For example, the first screen 1010 may be an execution screen of an application for controlling devices to be controlled (e.g., the device 204 to be controlled of FIG. 2) that are positioned in a specific space.

According to an embodiment, when a first object 1020 is selected from among the plurality of objects displayed on the external electronic device 202, the wearable electronic device 201 may obtain first information about a first device (e.g., the device 204 to be controlled of FIG. 2) indicated by the first object 1020.

According to an embodiment, the wearable electronic device 201 may identify a first position 1005 for displaying the first information corresponding to the first object 1020 as an augmented reality image, based on a gaze direction of a user identified through a sensor module (e.g., the sensor module 235 of FIG. 3A) and/or a camera module (e.g., the camera module 240 of FIG. 3A). For example, the first position 1005 may correspond to the position of a smart light.

Referring to FIG. 10B, according to an embodiment, the wearable electronic device 201 may display an augmented reality image 1030 at the first position 1005, based on the first information corresponding to the first object 1020, through the display 260.

Referring to FIG. 10C, according to an embodiment, the wearable electronic device 201 may adjust the position of the augmented reality image 1030, based on a user input to the external electronic device 202. For example, when identifying an input of dragging the first object 1020 in a right direction, the external electronic device 202 may transmit a command to move the position of the augmented reality image 1030 in the right direction to the wearable electronic device 201. Upon receiving the command, the wearable electronic device 201 may move the position of the augmented reality image 1030 in the right direction.

Figure 11A:
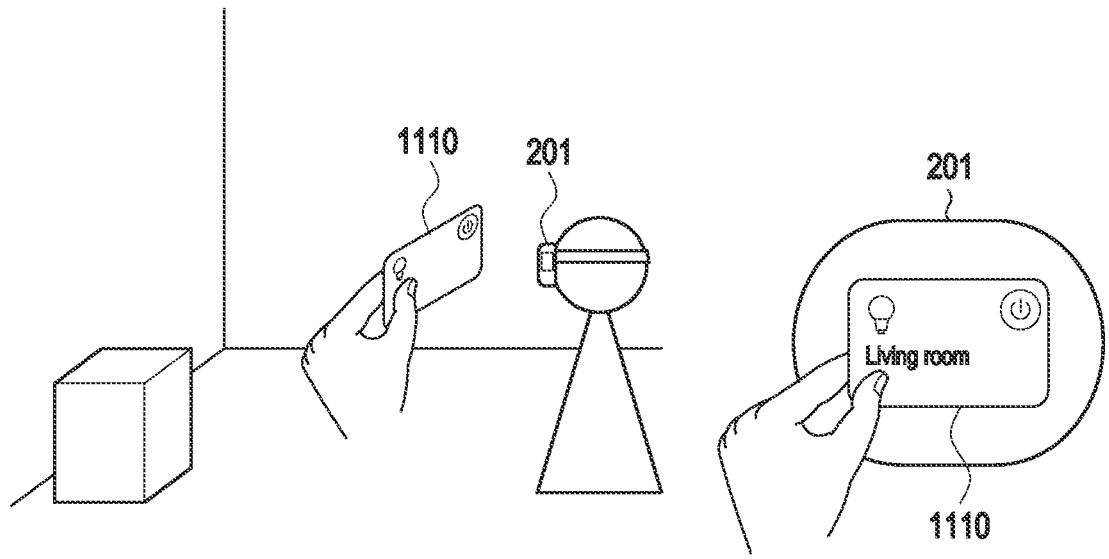
FIGS. 11A, 11B, and 11C illustrate an operation in which a wearable electronic device displays information about a device indicated by a selected object according to an embodiment of the disclosure.
Figure 11B:
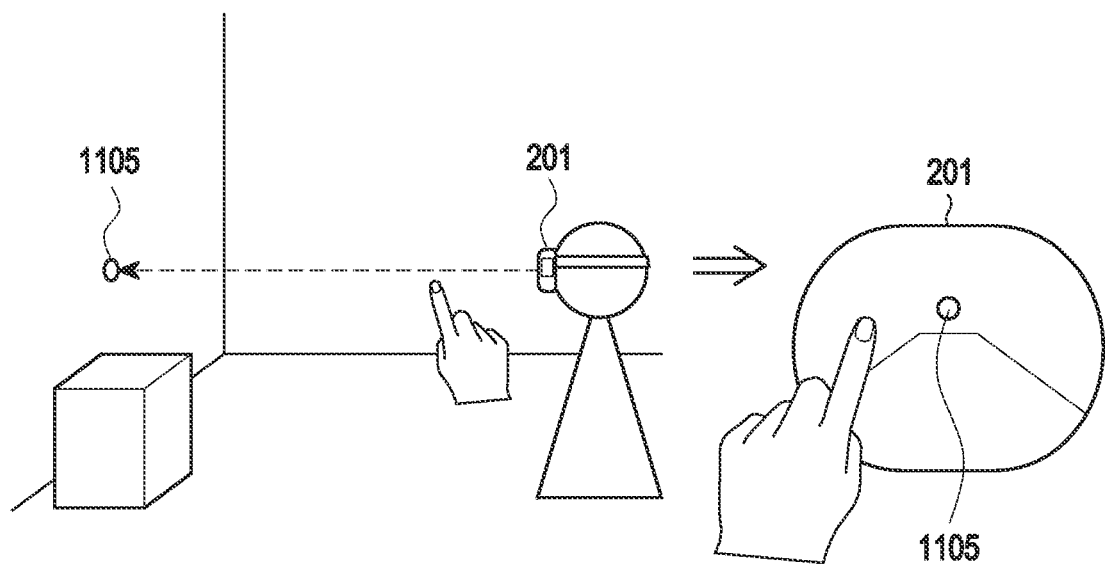
Figure 11C:
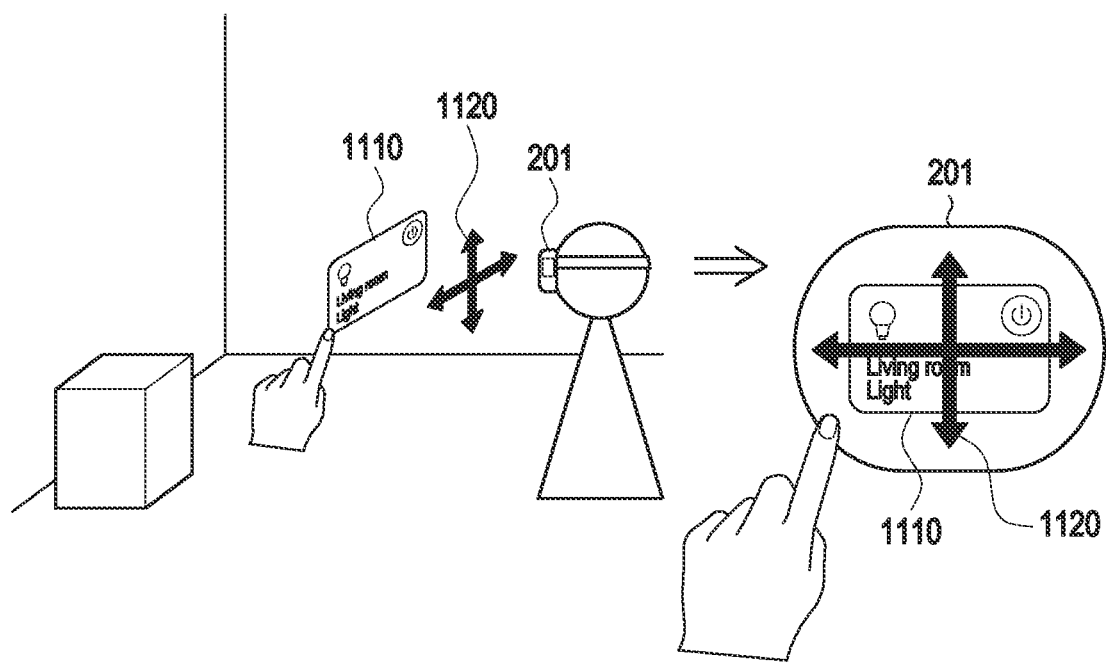

FIGS. 11A, 11B, and 11C illustrate an operation in which a wearable electronic device displays information about a device indicated by a selected object according to an embodiment of the disclosure.

Referring to FIGS. 11A, 11B, and 11C, according to an embodiment, the wearable electronic device 201 may display an augmented reality image 1110, based on first information corresponding to a first object 1020, through a display (e.g., the display 260 of FIG. 3A). For example, the wearable electronic device 201 may determine or adjust a property of the augmented reality image 1110, based on a user input. For example, the wearable electronic device 201 may determine or adjust the position, angle, transparency, size, direction, form, or shape of the augmented reality image 1110, based on a predetermined gesture input. For example, a plurality of gestures may be configured to adjust different properties. For example, the wearable electronic device 201 may determine or adjust a property of the augmented reality image 1110 designated for a gesture, based on each of a plurality of predetermined gestures.

Referring to FIG. 11A, according to an embodiment, the wearable electronic device 201 may adjust at least one of the transparency or size of the augmented reality image 1110, based on a gesture input or voice input by a user identified through a sensor module (e.g., the sensor module 235 of FIG. 3A) and/or a camera module (e.g., the camera module 240 of FIG. 3A). For example, the wearable electronic device 201 may adjust at least one of the transparency or size of the augmented reality image 1110, based on a specific hand-shaped gesture. For example, when identifying a gesture of the user moving a hand up and down with an index finger and a thumb put together, the wearable electronic device 201 may increase or decrease the transparency of the augmented reality image 1110. Further, when identifying a gesture of the user moving a hand right and left (or to be distant from or close to the user) with an index finger and a thumb put together, the wearable electronic device 201 may increase or decrease the size of the augmented reality image 1110. For example, when the user tilts a hand at a predetermined angle in at least one of forward, backward, left, and rear directions with the hand being in a specific shape, the wearable electronic device 201 may tilt the augmented reality image 1110 by the predetermined angle in the direction.

Referring to FIG. 11B, according to an embodiment, when a user input of releasing a selection is identified through the sensor module (e.g., the sensor module 235 of FIG. 3A) and/or the camera module (e.g., the camera module 240 of FIG. 3A), the wearable electronic device 201 may release (or stop) a selection for adjusting the property of the augmented reality image 1110. For example, the wearable electronic device 201 may recognize an index finger and a thumb of the user being close by less than a certain distance as an operation of selecting the augmented reality image 1110, and may recognize the index finger and the thumb being distant by the certain distance or longer as an operation of releasing the augmented reality image 1110. Alternatively, when a new input is not identified for a specified time after selecting the augmented reality image, the wearable electronic device 201 may release the selection for adjusting the property of the augmented reality image 1110. The wearable electronic device 201 may display the augmented reality image 1110 at a first position 1105 with an existing configuration of the augmented reality image 1110 maintained. Alternatively, when the augmented reality image 1110 has not yet been displayed at the first position 1105, the wearable electronic device 201 may not display the augmented reality image 1110.

Referring to FIG. 11C, the wearable electronic device 201 may adjust the position of the augmented reality image 1110, based on a gesture input or voice input by the user obtained through the sensor module (e.g., the sensor module 235 of FIG. 3A) and/or the camera module (e.g., the camera module 240 of FIG. 3A). Alternatively, the wearable electronic device 201 may determine or adjust the slope of the augmented reality image, based on a change in the user's gaze direction identified through the sensor module and/or the camera module. For example, the wearable electronic device 201 may display a guide image 1120 for guiding the user to a gesture input (e.g., the user's finger gesture or a change in the gaze direction) or a voice input through a display (e.g., the display 260 of FIG. 3A. For example, the guide image 1120 may include an image that displays at least one of left, right, up, and down directions. For example, the wearable electronic device 201 may display the guide image 1120 in place of the augmented reality image 1110 or may display the augmented reality image 1110 and the guide image 1120 together.

Figure 12:
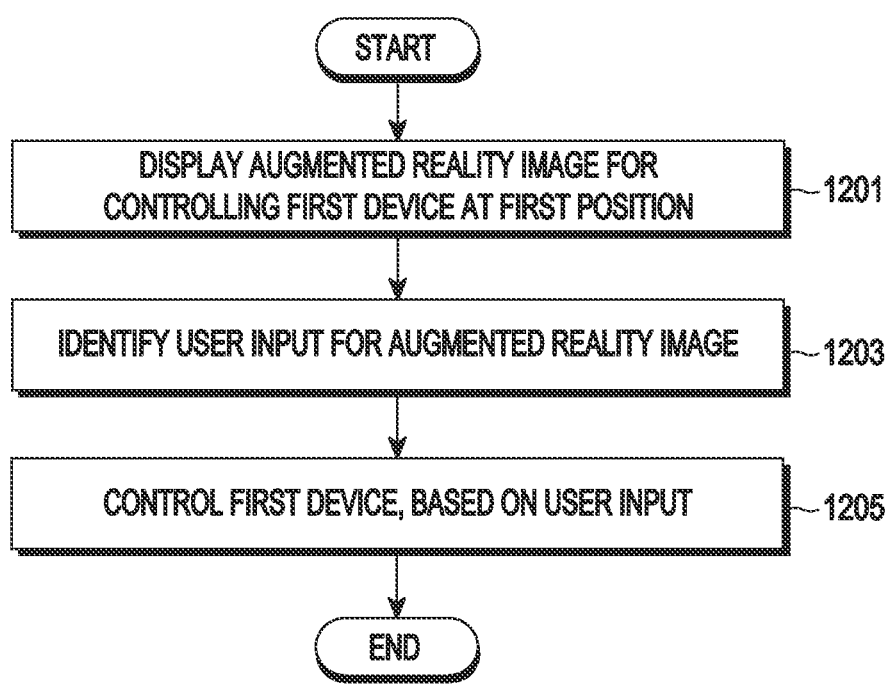
FIG. 12 is a flowchart illustrating an operation in which a wearable electronic device controls a device using information about the device displayed through a display object according to an embodiment of the disclosure.

FIG. 12 is a flowchart illustrating an operation in which a wearable electronic device controls a device using information about the device displayed through a display object according to an embodiment of the disclosure.

Referring to FIG. 12, according to an embodiment, in operation 1201, the wearable electronic device (e.g., the wearable electronic device 201 of FIGS. 2 and 3A) may display an augmented reality image for controlling a first device (e.g., the device 204 to be controlled of FIG. 2), which is a device to be controlled, at a first position.

According to an embodiment, in operation 1203, the wearable electronic device may identify a user input for the augmented reality image. For example, the user input may include a touch input, a gesture input, or a voice input to the wearable electronic device.

According to an embodiment, in operation 1205, the wearable electronic device may control the first device, based on the user input. For example, the wearable electronic device may transmit a command to perform a function (or operation) corresponding to the user input to the first device. The first device may receive the command and may perform the function (or operation) corresponding to the user input. For example, the command may be transmitted from the wearable electronic device to the first device via an external electronic device (e.g., the external electronic device 202 of FIG. 2). Alternatively, the command may be directly transmitted from the wearable electronic device to the first device. In addition, the command may be transmitted from the wearable electronic device to the first device through various paths.

Figure 13A:
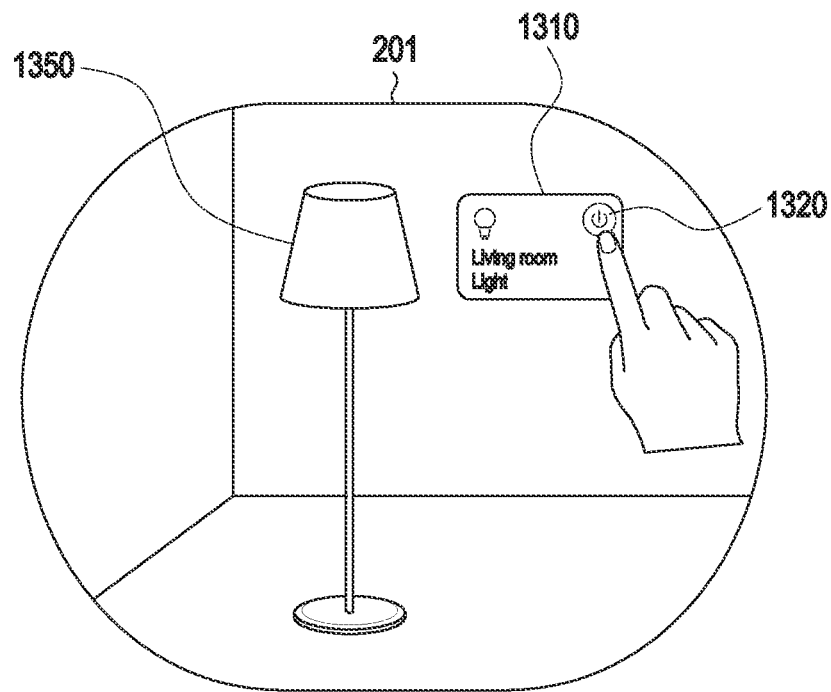
FIGS. 13A and 13B illustrate an operation in which a wearable electronic device controls a device using information about the device displayed through a display object according to an embodiment of the disclosure.
Figure 13B:
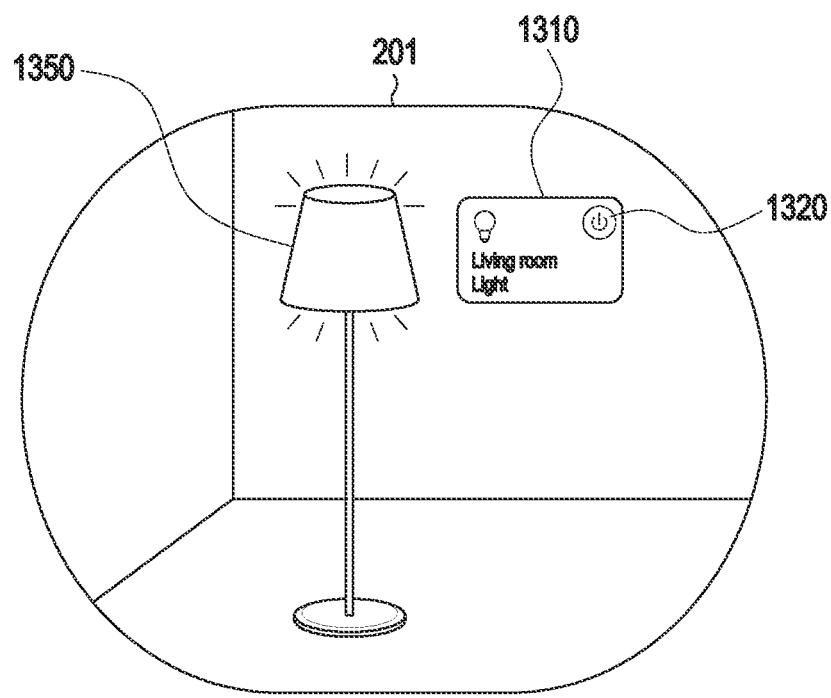

FIGS. 13A and 13B illustrate an operation in which a wearable electronic device controls a device using information about the device displayed through a display object according to an embodiment of the disclosure.

Referring to FIGS. 13A and 13B, according to an embodiment, a wearable electronic device may display an augmented reality image 1310 for controlling a device to be controlled.

Referring to FIG. 13A, according to an embodiment, the wearable electronic device 201 (e.g., the wearable electronic device 201 of FIGS. 2 and 3A) may display the augmented reality image 1310 for controlling the device 1350 to be controlled (e.g., a smart light) to be fixed at a first position. For example, the first position may be a position next to the device 1350 to be controlled. For example, the augmented reality image 1310 may include a control object 1320 that controls a specific function of the device 1350 to be controlled.

Referring to FIG. 13B, according to an embodiment, the wearable electronic device 201 may identify a user input for the control object 1320 included in the augmented reality image 1310. For example, the user input may include a gesture input of pressing the control object 1320 or a voice input of requesting performance of a function indicated by the control object 1320.

According to an embodiment, the wearable electronic device 201 may generate a command for the device 1350 to be controller to perform the function indicated by the control object 1320, based on identification of the user input. The wearable electronic device 201 may transmit the generated command to the device 1350 to be controlled. The device 1350 to be controlled may perform the function (e.g., turning on the light) indicated by the control object 1320 in response to the received command.

A wearable electronic device (e.g., the wearable electronic device 201 of FIGS. 2 and 3A) according to an embodiment may include a camera (e.g., the camera module 240 of FIG. 3A), a communication circuit (e.g., the communication circuit 290 of FIG. 3A), a display (e.g., the display 260 of FIG. 3A) including a transparent lens and displaying content through the lens, and a processor (e.g., the processor 220 of FIG. 3A), wherein the processor may be configured to obtain first information about a first device (e.g., the device 204 to be controlled of FIG. 2) indicated by a first object through the communication circuit when the first object is selected from among a plurality of objects for controlling devices displayed on an external electronic device (e.g., the external electronic device 202 of FIG. 2), identify a first position for displaying the first information corresponding to the first object as an augmented reality image, based on a gaze direction of a user identified through the camera, identify a property of the augmented reality image, based on a user input, and control the display to display the augmented reality image having the property at the first position.

The processor may be configured to adjust at least one of a size, form, shape, transparency, slope, direction, color, or position of the augmented reality image, based on the user input.

The processor may be configured to determine the user input, based on a gesture of the user identified through a sensor included in the wearable electronic device.

The processor may be configured to determine the user input, based on an input to the external electronic device.

The processor may be configured to identify whether the user gazes at the first object for a specified time through the camera, and select the first object when the user gazes at the first object for the specified time.

The processor may be configured to identify an identifier of the first object included in the first object displayed on the external electronic device through the camera, and identify whether the user gazes at the first object using the identified identifier.

The processor may be configured to receive information indicating selection of the first object and the first information about the device indicated by the first object from the external electronic device when the first object is selected by a user input in the external electronic device.

The processor may be configured to obtain 3D space coordinate information about an area indicated by the gaze direction, and determine the first position, based on a first coordinate corresponding to the gaze direction among coordinates of a closed space included in the 3D coordinate information.

The processor may be configured to display an image showing a path between a position indicated by the first coordinate and the wearable electronic device through the display.

The processor may be configured to display the augmented reality image to be fixed at the first position.

An operating method of a wearable electronic device (e.g., the wearable electronic device 201 of FIGS. 2 and 3A) according to an embodiment may include obtaining first information about a first device (e.g., the device 204 to be controlled of FIG. 2) indicated by a first object through a communication circuit (e.g., the communication circuit 290 of FIG. 3A) of the wearable electronic device when the first object is selected from among a plurality of objects for controlling devices displayed on an external electronic device (e.g., the external electronic device 202 of FIG. 2), identifying a first position for displaying the first information corresponding to the first object as an augmented reality image, based on a gaze direction of a user identified through a camera (e.g., the camera module 240 of FIG. 3A) of the wearable electronic device, identifying a property of the augmented reality image, based on a user input, and displaying the augmented reality image having the property at the first position through a display (e.g., the display 260 of FIG. 3A) including a transparent lens included in the wearable electronic device.

The identifying of the property of the augmented reality image, based on the user input, may include adjusting at least one of a size, form, shape, transparency, slope, direction, color, or position of the augmented reality image, based on the user input.

The identifying of the property of the augmented reality image, based on the user input, may include determining the user input, based on a gesture of the user identified through a sensor included in the wearable electronic device.

The identifying of the property of the augmented reality image, based on the user input, may include determining the user input, based on an input to the external electronic device.

The operating method of the electronic device may further include identifying whether the user gazes at the first object for a specified time through the camera, and selecting the first object when the user gazes at the first object for the specified time.

The identifying whether the user gazes at the first object may include identifying an identifier of the first object included in the first object displayed on the external electronic device through the camera, and identifying whether the user gazes at the first object using the identified identifier.

The identifying of the first position may include obtaining 3D space coordinate information about an area indicated by the gaze direction, and determining the first position, based on a first coordinate corresponding to the gaze direction among coordinates of a closed space included in the 3D coordinate information.

The operating method of the electronic device may further include displaying an image showing a path between a position indicated by the first coordinate and the wearable electronic device through the display.

The displaying of the augmented reality image at the first position may include displaying the augmented reality image to be fixed at the first position.

A non-transitory recording medium the program comprising instructions configured to, when executed by at least one processor of a wearable electronic device (e.g., the wearable electronic device 201 of FIGS. 2 and 3A), cause the wearable electronic device to obtain first information about a first device (e.g., the device 204 to be controlled of FIG. 2) indicated by a first object through the communication circuit (e.g., the communication circuit 290 of FIG. 3A) of the wearable electronic device when the first object is selected from among a plurality of objects for controlling devices displayed on an external electronic device (e.g., the external electronic device 202 of FIG. 2), identify a first position for displaying the first information corresponding to the first object as an augmented reality image, based on a gaze direction of a user identified through a camera (e.g., the camera module 240 of FIG. 3A) included in the wearable electronic device, identify a property of the augmented reality image, based on a user input, and display the augmented reality image having the property at the first position through a display (e.g., the display 260 of FIG. 3A) including a transparent lens included in the wearable electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable electronic device comprising:
    a camera;
    a communication circuit;
    a display; and
    a processor configured to:
        in response to a first object being selected from among a plurality of objects being displayed by an external electronic device, obtain, through the communication circuit, first information about a first device indicated by the first object, the plurality of objects being objects used for controlling a plurality of devices, respectively,
        identify a first position in a specific space identified through the camera after the first object is selected, wherein the first position corresponds to one of a wall, a floor, a specific object, or a specific device in the specific space,
        identify coordinate information corresponding to the first position with respect to the specific space to display an augmented reality object for controlling the first device, wherein the augmented reality object is obtained based on the first information,
        control the display to display, at the first position, the augmented reality object corresponding to an augmented reality image of the first object, based on the coordinate information,
        based on a user input, identify an attribute of the augmented reality object, and
        control the display to display the augmented reality object having the attribute.

2. The wearable electronic device of claim 1, wherein the processor is further configured to:
    based on the user input, adjust at least one of a size, a form, a shape, a level of transparency, a slope, a direction, a color, or a position of the augmented reality object.

3. The wearable electronic device of claim 2, wherein the processor is further configured to:
    based on a gesture of a user identified through a sensor of the wearable electronic device, identify the user input.

4. The wearable electronic device of claim 2, wherein the processor is further configured to:
    based on an input received by to the external electronic device, determine the user input.

5. The wearable electronic device of claim 1, wherein the processor is further configured to:
    identify whether a user gazes at the first object for a specified period of time through the camera, and
    in response to identifying that the user gazes at the first object for the specified period of time, select the first object.

6. The wearable electronic device of claim 5, wherein the processor is further configured to:
    identify an identifier of the first object through the camera, the identifier being comprised in the first object displayed on the external electronic device, and
    identify whether the user gazes at the first object using the identified identifier.

7. The wearable electronic device of claim 1, wherein the processor is further configured to:
    in response to the first object being selected by an input received by the external electronic device, receive information indicating selection of the first object and the first information about the first device indicated by the first object from the external electronic device.

8. The wearable electronic device of claim 1, wherein the processor is further configured to:
   obtain three-dimensional (3D) space coordinate information about an area indicated by a gaze direction of a user, and
   identify the first position based on a first coordinate corresponding to the gaze direction among coordinates of a closed space comprised in the 3D space coordinate information.

9. The wearable electronic device of claim 1, wherein the processor is further configured to:
   control the display to display an image showing a path between a position indicated by a first coordinate and the wearable electronic device.

10. The wearable electronic device of claim 1, wherein the processor is further configured to:
    control the display to display the augmented reality object fixed at the first position.

11. The wearable electronic device of claim 1,
    wherein the first device comprises one of a smart light bulb, a smart air conditioner, a robot vacuum cleaner, a smart window, a smart door, a smart curtain, a smart home appliance, or a smart light,
    wherein the first information comprises state information about the first device, information about a command to control the first device, and user interface information about a control menu, and
    wherein the plurality of objects are representations of the plurality of devices, respectively, and include a respective icon corresponding to a respective device.

12. An operating method of a wearable electronic device, the operating method comprising:
    in response to a first object being selected from among a plurality of objects being displayed by an external electronic device, obtaining, through a communication circuit of the wearable electronic device, first information about a first device indicated by the first object, the plurality of objects being objects used for controlling a plurality of devices, respectively;
    identifying a first position in a specific space identified through a camera after the first object is selected, wherein the first position corresponds to one of a wall, a floor, a specific object, or a specific device in the specific space;
    identifying coordinate information corresponding to the first position with respect to the specific space to display an augmented reality object for controlling the first device, wherein the augmented reality object is obtained based on the first information;
    displaying, at the first position of a display including a transparent lens included in the wearable electronic device, the augmented reality object corresponding to an augmented reality image of the first object, based on the coordinate information;
    based on a user input, identifying an attribute of the augmented reality object; and
    displaying, through the display, the augmented reality object having the attribute.

13. The operating method of claim 12, further comprising:
    based on the user input, adjusting at least one of a size, a form, a shape, a level of transparency, a slope, a direction, a color, or a position of the augmented reality object.

14. The operating method of claim 13, further comprising:
    based on a gesture of a user identified through a sensor of the wearable electronic device, identifying the user input.

15. The operating method of claim 13, further comprising:
    based on an input applied to the external electronic device, determining the user input.

16. The operating method of claim 12, further comprising:
    identifying whether a user gazes at the first object for a specified period of time through the camera; and
    in response to identifying that the user gazes at the first object for the specified period of time, selecting the first object.

17. The operating method of claim 16, wherein the identifying whether the user gazes at the first object comprises:
    identifying an identifier of the first object through the camera, the identifier being comprised in the first object displayed on the external electronic device; and
    identifying whether the user gazes at the first object using the identified identifier.

18. The operating method of claim 12, wherein the identifying of the first position comprises:
    obtaining three-dimensional (3D) space coordinate information about an area indicated by a gaze direction of a user; and
    identifying the first position based on a first coordinate corresponding to the gaze direction among coordinates of a closed space comprised in the 3D space coordinate information.

19. The operating method of claim 12, further comprising:
    displaying an image showing a path between a position indicated by a first coordinate and the wearable electronic device through the display.

20. The operating method of claim 12, wherein the displaying of the augmented reality object at the first position comprises displaying the augmented reality object fixed at the first position through the display.

21. A non-transitory recording medium storing a program, the program comprising instructions which, when executed by at least one processor of a wearable electronic device, cause the wearable electronic device to:
    in response to a first object being selected from among a plurality of objects being displayed by an external electronic device, obtain, through a communication circuit of the wearable electronic device, first information about a first device indicated by the first object, the plurality of objects being objects used for controlling a plurality of devices, respectively;
    identify a first position pointed by a gaze of a user in a specific space identified through a camera after the first object is selected, wherein the first position corresponds to one of a wall, a floor, a specific object, or a specific device in the specific space;
    identify coordinate information corresponding to the first position with respect to the specific space to display an augmented reality object for controlling the first device, wherein the augmented reality object is obtained based on the first information;
    display, at the first position, the augmented reality object corresponding to an augmented reality image of the first object, based on the coordinate information;
    based on a user input, identify an attribute of the augmented reality object; and
    display, through the display, the augmented reality object having the attribute.

22. The non-transitory recording medium of claim 21, wherein a gaze direction is based on coordinates of the first position in real space.

23. The non-transitory recording medium of claim 21, wherein the user input includes at least one of a touch input, a gesture input, or a voice input.

24. The non-transitory recording medium of claim 21, wherein the camera includes a first camera for tracking a hand and a second camera for tracking an eye.

* * * * *